A. LOOMIS.
KEY MECHANISM FOR WOOD WIND INSTRUMENTS.
APPLICATION FILED AUG. 20, 1913. RENEWED MAY 28, 1919.
1,336,359. Patented Apr. 6, 1920.
9 SHEETS—SHEET 3.
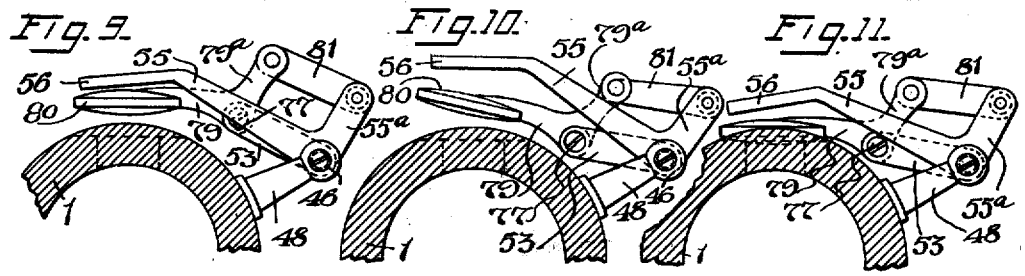
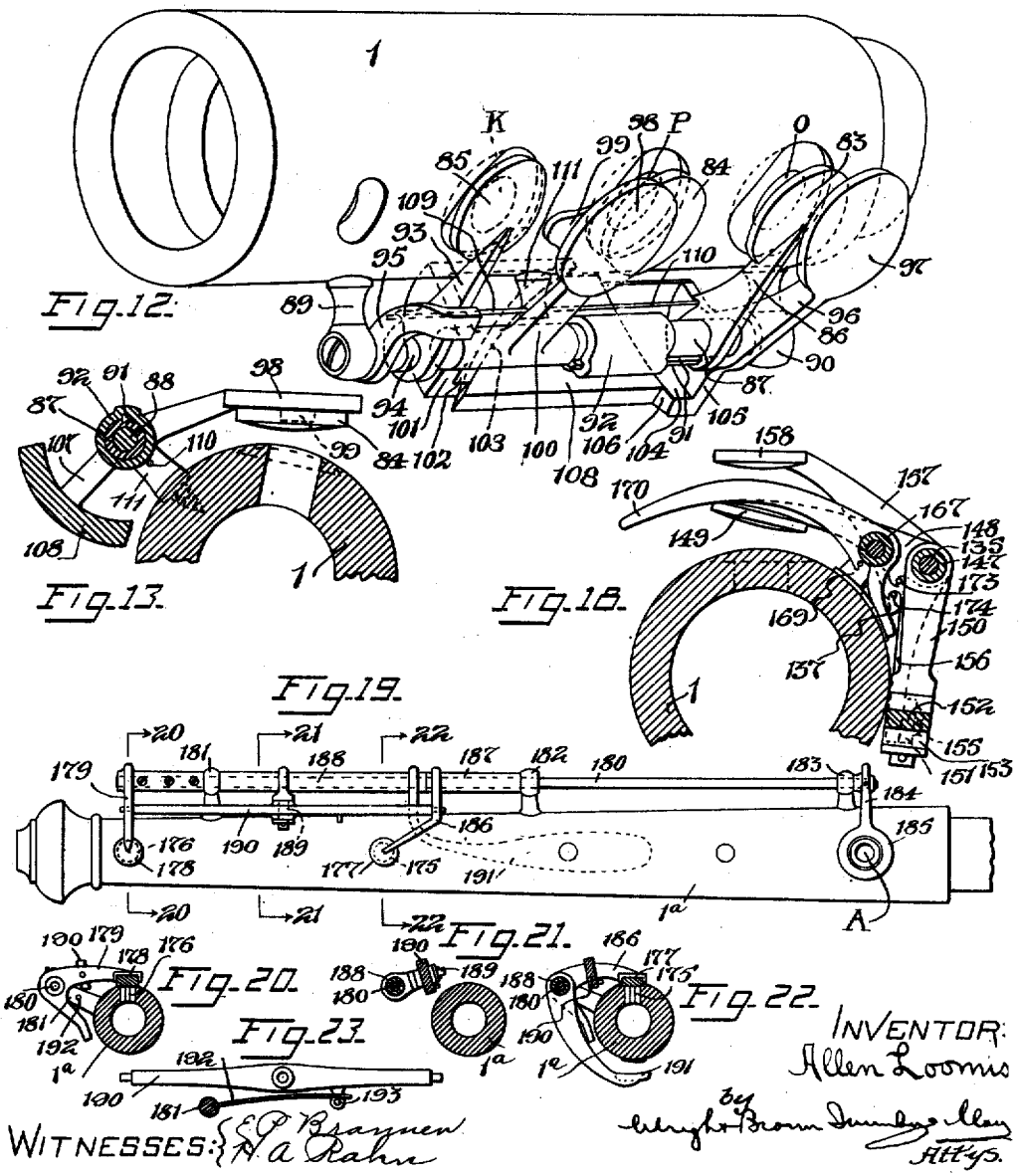

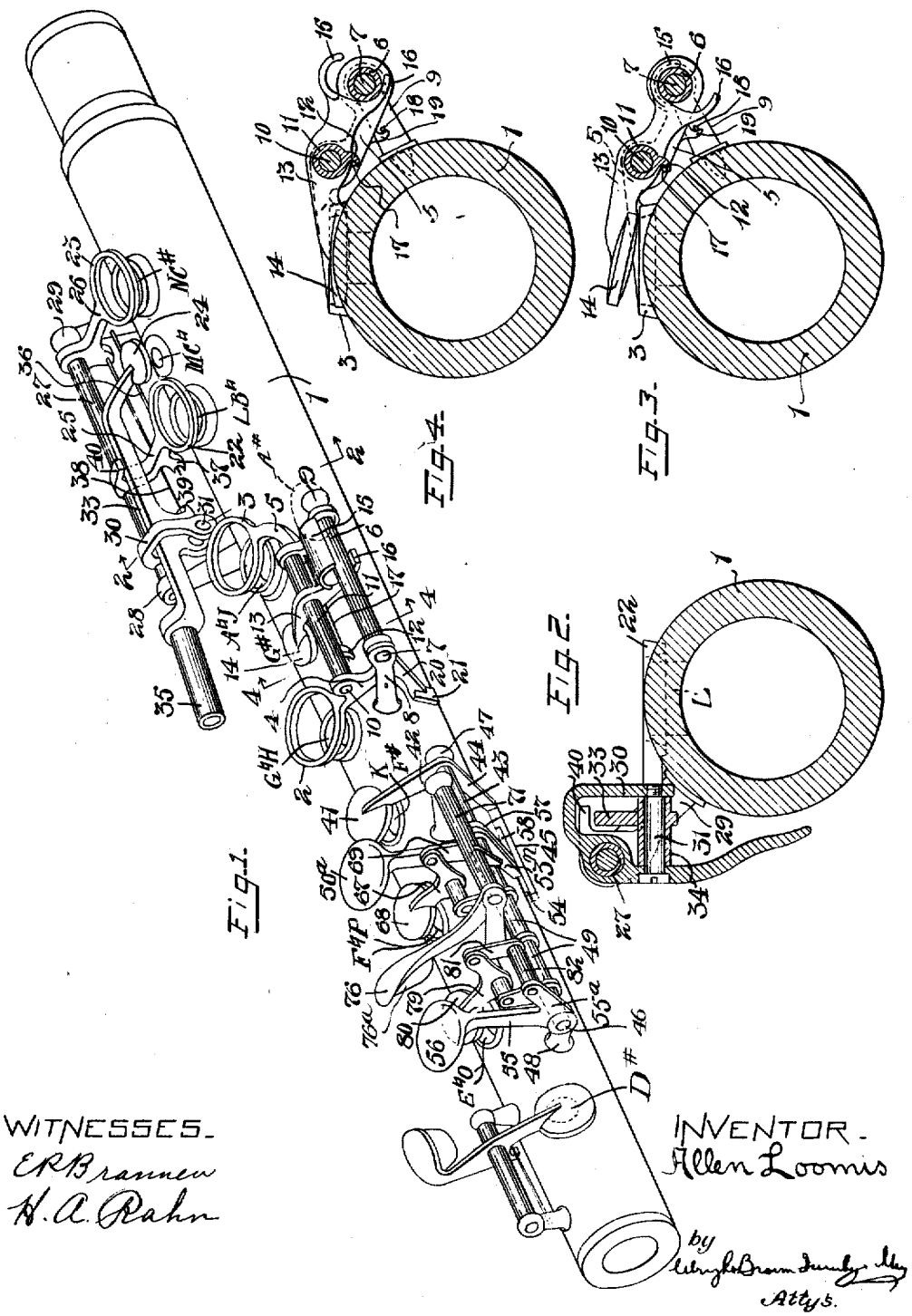

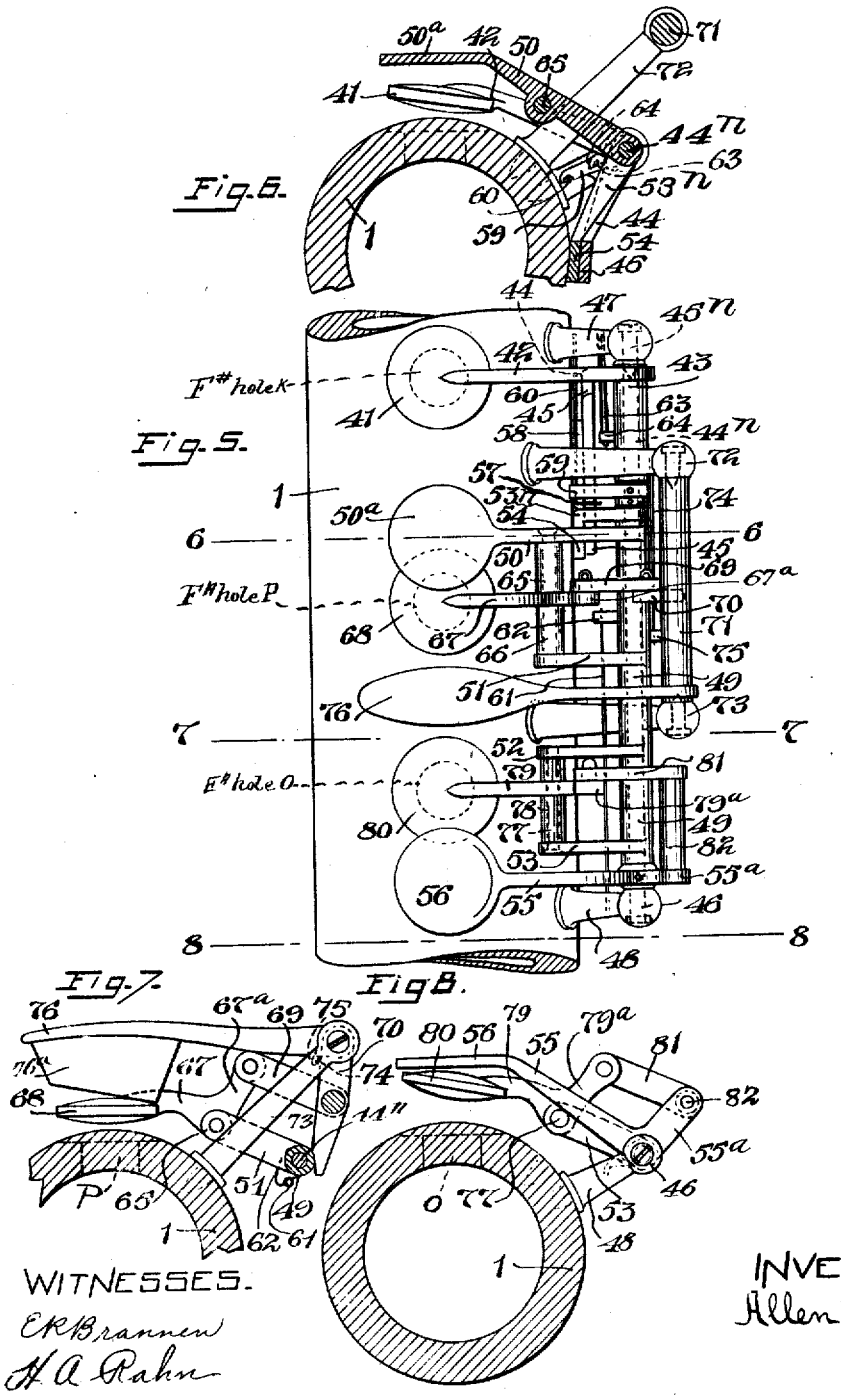

A. LOOMIS.
KEY MECHANISM FOR WOOD WIND INSTRUMENTS.
APPLICATION FILED AUG. 20, 1913. RENEWED MAY 28, 1919.
1,336,359.
Patented Apr. 6, 1920.
9 SHEETS—SHEET 4.
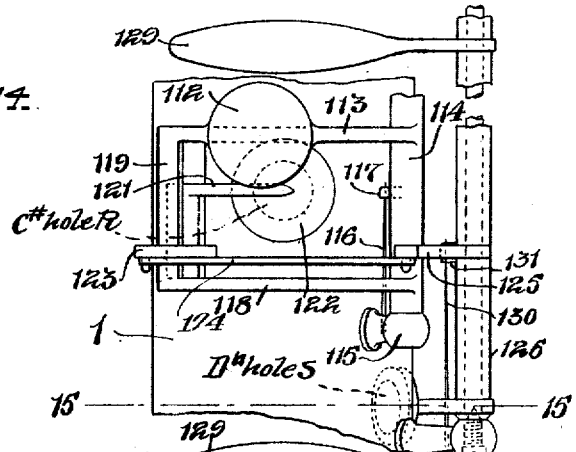
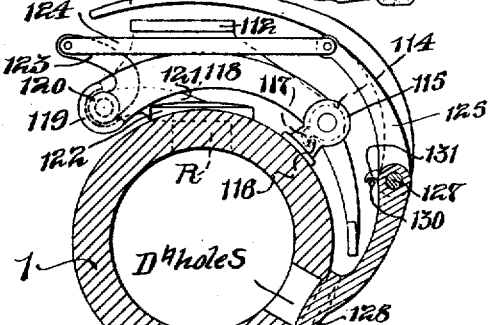
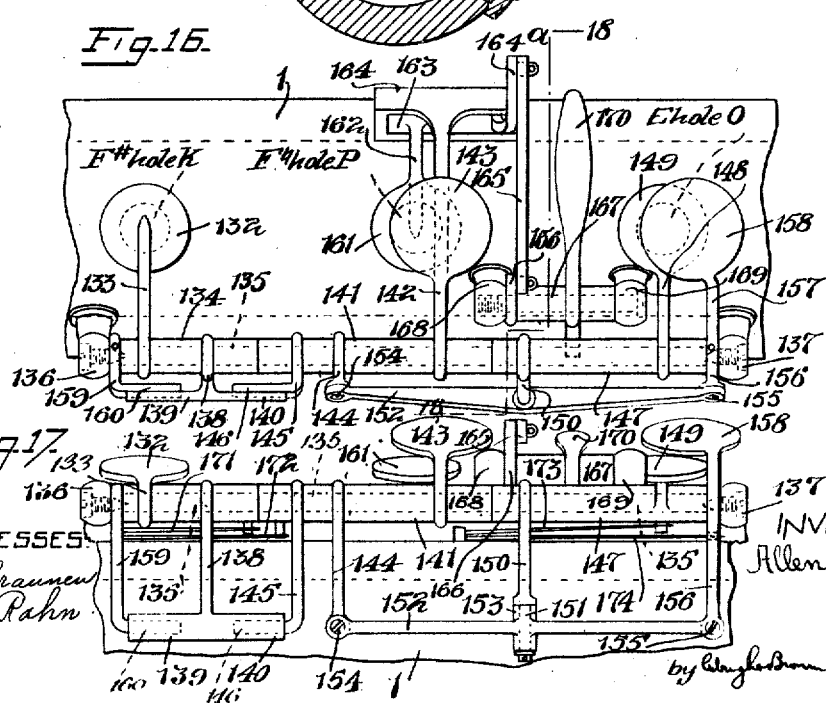
WITNESSES
C P Braunen
N A Rahn
INVENTOR
Allen Loomis
by Wingfield Brown Dundy Uly
Atty's

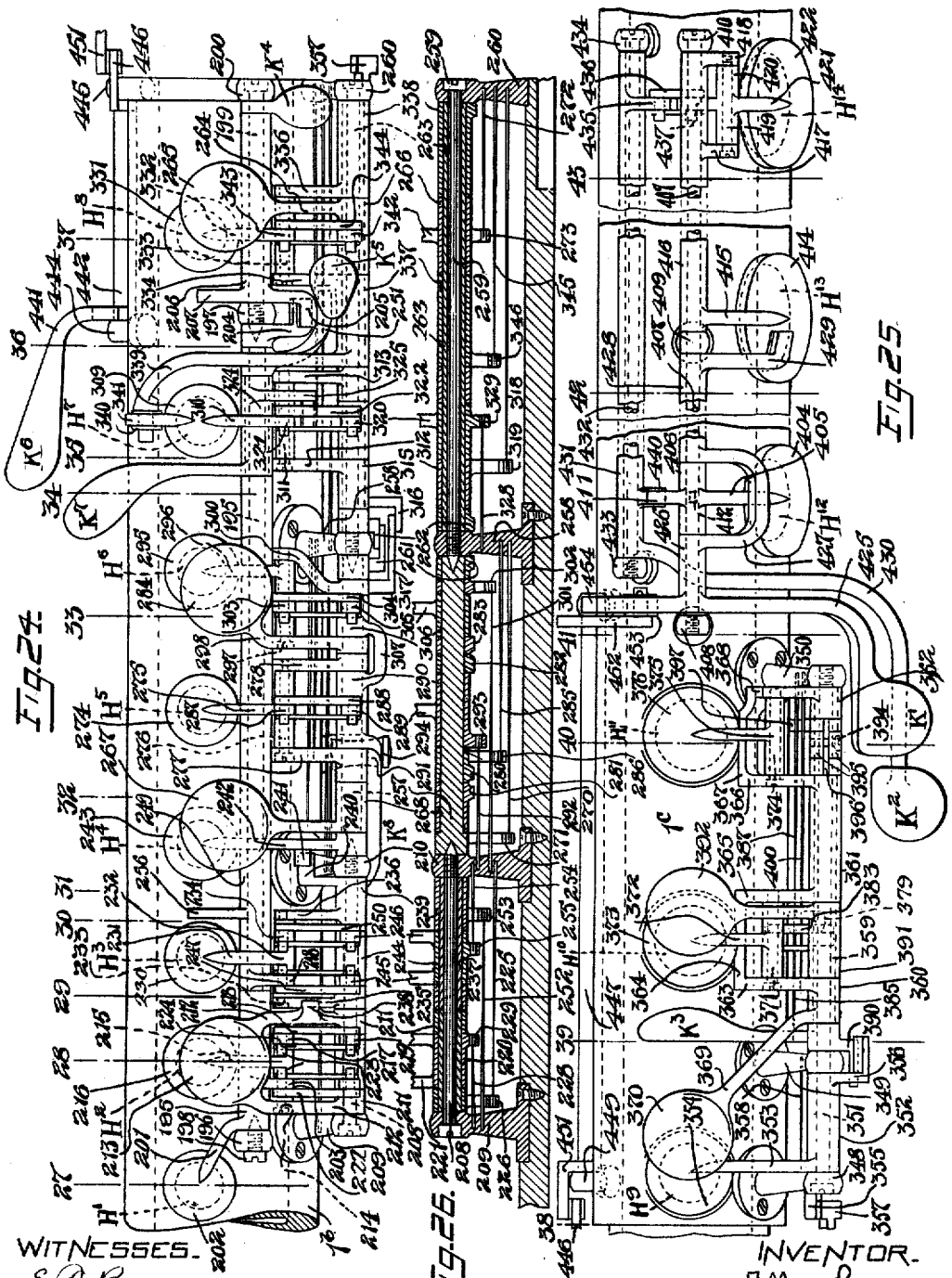

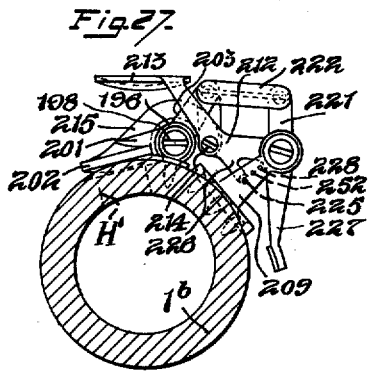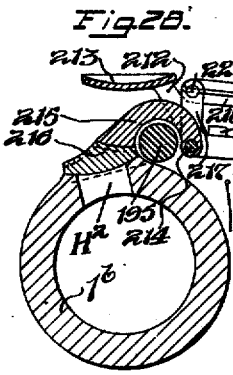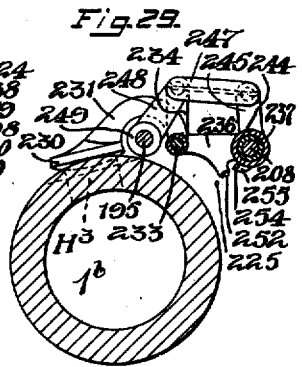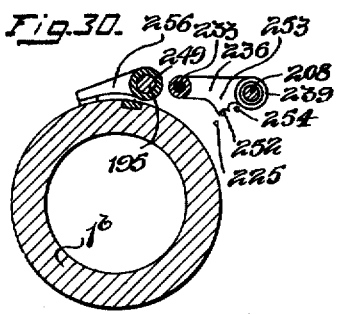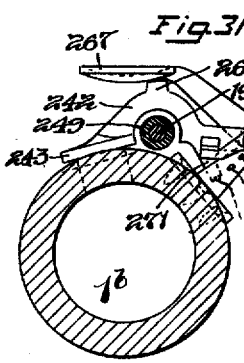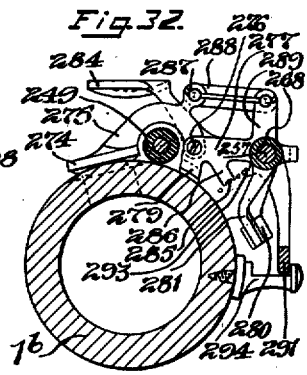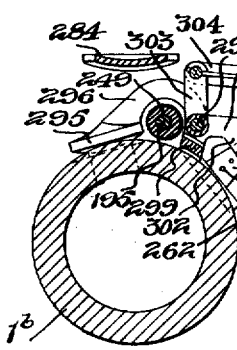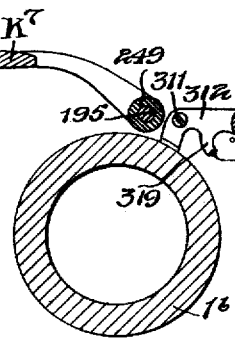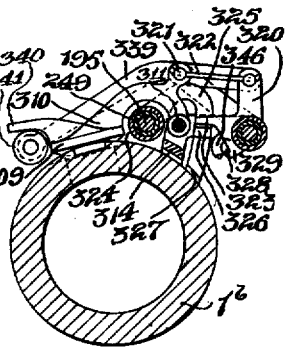

A. LOOMIS.
KEY MECHANISM FOR WOOD WIND INSTRUMENTS.
APPLICATION FILED AUG. 20, 1913. RENEWED MAY 28, 1919.
1,336,359.
Patented Apr. 6, 1920.
9 SHEETS—SHEET 7.
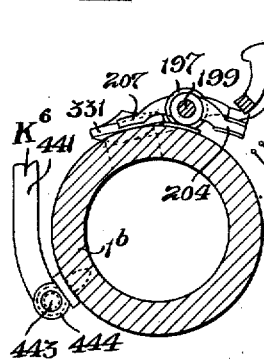
Fig. 36.
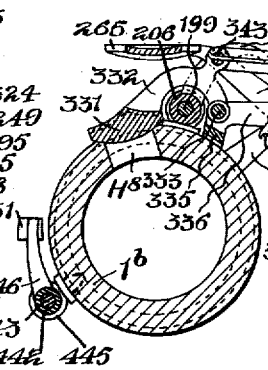
Fig. 37.
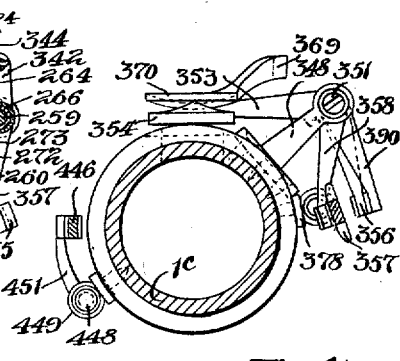
Fig. 38.
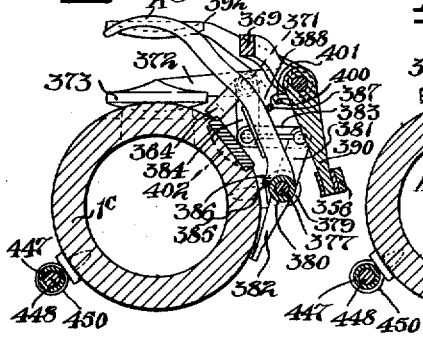
Fig. 39. Fig. 40. Fig. 41.
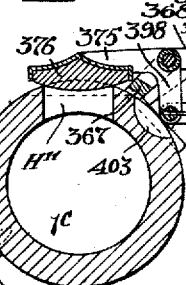
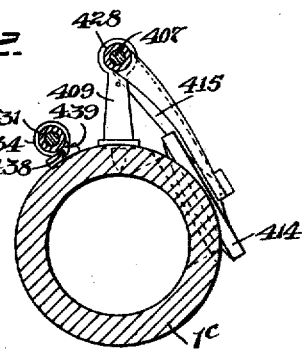
Fig. 42.
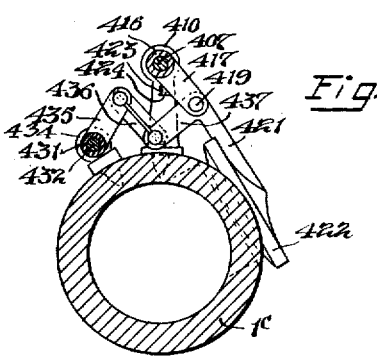
Fig. 43.
WITNESSES.
C. R. Brannen
H. A. Rahn
INVENTOR.
Allen Loomis
by Wright, Brown, Quinby & Many
Atty's.

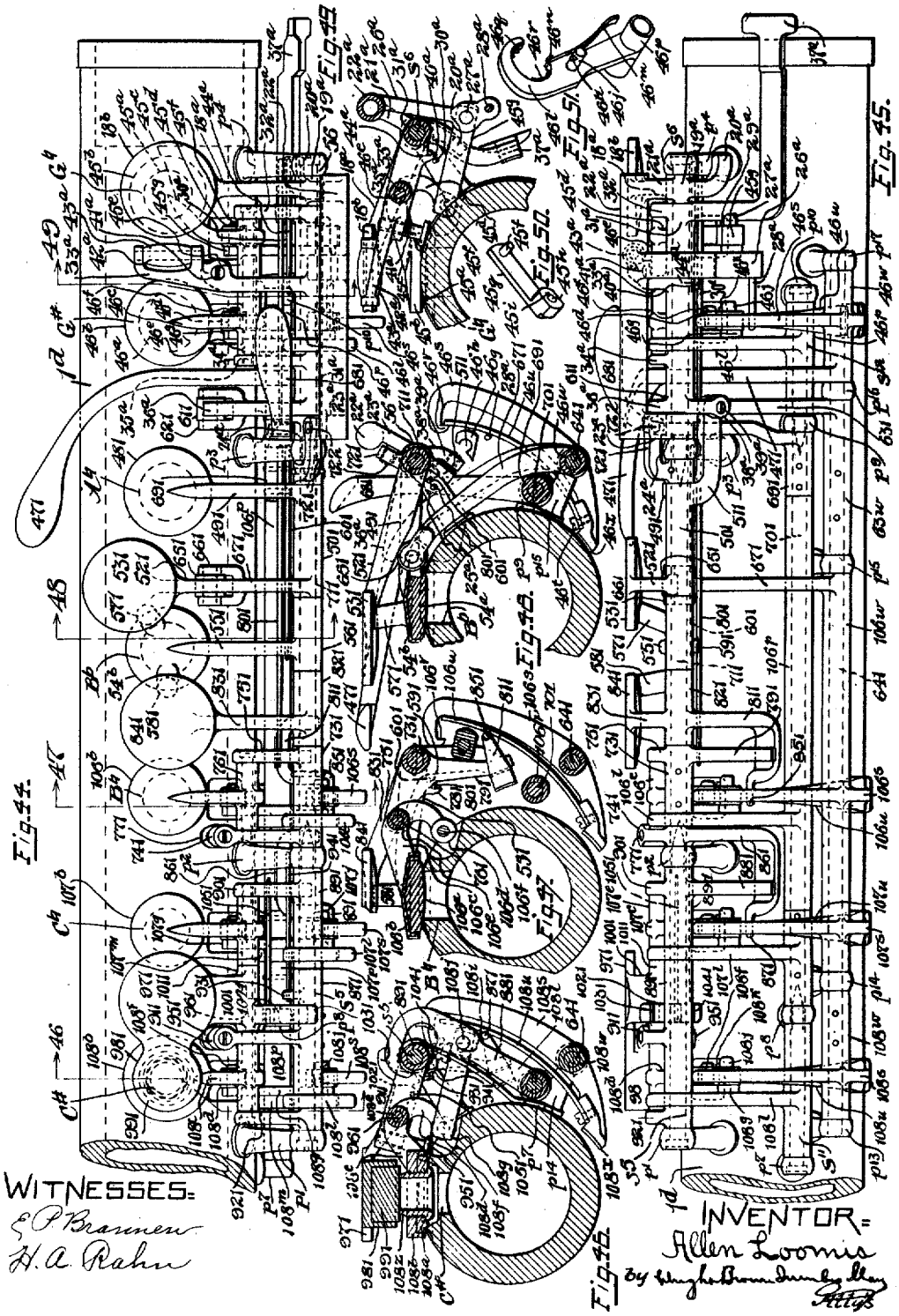

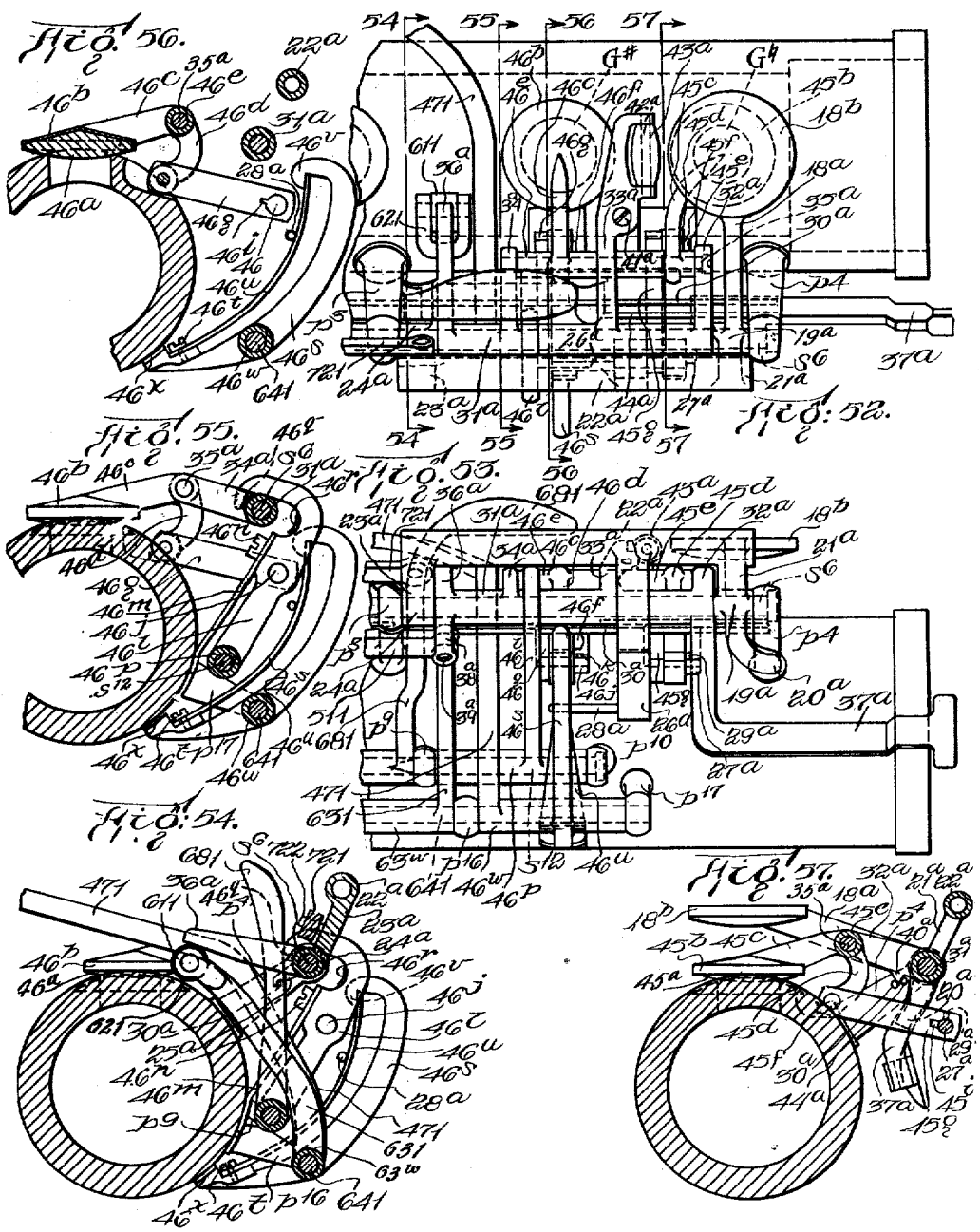

UNITED STATES PATENT OFFICE.

ALLEN LOOMIS, OF DETROIT, MICHIGAN.

KEY MECHANISM FOR WOOD-WIND INSTRUMENTS.

1,336,359. Specification of Letters Patent. Patented Apr. 6, 1920.

Application filed August 20, 1913, Serial No. 785,707. Renewed May 28, 1919. Serial No. 300,482.

*To all whom it may concern:*

Be it known that I, ALLEN LOOMIS, a citizen of the United States, and resident of Detroit, in the county of Wayne and State of Michigan, have invented certain new and useful Improvements in Key Mechanism for Wood-Wind Instruments, of which the following is a specification.

This invention relates to musical instruments of the type known as "wood-wind," and to instruments of that nature, whether actually made of wood, or of metal, rubber, or any other material; or, in other words, to instruments distinguished by holes in the side of the tube, which forms the body of the instrument, adapted to be stopped and opened in order to alter the vibrating length of the resonant body of air in such tube and thereby determine the pitch of the tone produced. In this class of instruments are included not only such well known and commonly used instruments as the flute, piccolo, clarinet, oboe, bassoon and saxophone, but all other instruments having the distinguishing characteristic of tone holes in the body of the instrument communicating with the interior thereof, to all of which instruments my invention is applicable, whatever the form, the means for producing the tone, and other characteristics of the instrument may be. It is particularly with the key mechanisms of such instruments that my invention is concerned. Nearly all instruments of the type above indicated are provided with mechanical stoppers and key mechanisms for stopping at least some of the tone holes, instead of having all the holes stopped by the fingers of the performer directly, and instruments of the better grades have more mechanical stoppers and a greater number and variety of manually operated key mechanisms for operating them than those of the poorer and cheaper grades, for the obvious reason that operating finger keys, located more conveniently to the player's fingers than the holes themselves, increase ease of playing and brilliancy of execution.

Many inventions and improvements have thus far been made in such mechanisms with this end in view, but in spite of all that has been accomplished, there remain some sequences of notes, and trills, that cannot be played at all, and others which can be played only with great difficulty, and poorly, even by the best performers. The various instruments of the general type above referred to differ among themselves as to the note combinations which cannot be played, and some have greater flexibility, that is, can play a greater variety of note sequences, than others. It is the purpose of my invention to, among other things, remove the disabilities hitherto existent in such instruments, and make all the different instruments of the type indicated not only more flexible than at present, but equally flexible with one another, and capable of having all note sequences played upon them, without necessitating sacrifice in any degree of purity of tone or of other desirable tone qualities obtainable by the best old style instruments.

One of the most important of the prior inventions hereinbefore referred to, is that of the Boehm flute in which stoppers are provided for practically all the tone holes and are normally held open, and in which also the holes are made larger than those of the old style flute in order to permit the employment of the open key system, with the radical change in fingering involved in its use. But the Boehm flute, while having decided advantages on the side of execution over the old style flute, is inferior to the latter in point of tone qualities, resonance, etc., as is well known to those skilled in the use of the flute. My invention enables the mechanical advantages of the Boehm open key system to be utilized in connection with the old style flute, while retaining unimpaired all the musical and tonal superiorities of the latter, and enables some effects of execution to be produced which are not obtainable with the Boehm system; and further, it makes possible the application of these advantages to all instruments of the wood wind type. The fundamental principles of the invention may be applied to all the holes and keys of any of the instruments referred to, or all of them, and makes possible the following effects, viz: to play a major or minor trill on any note, and doing so by vibrating only one finger; to secure perfect venting of all notes, whether the upper notes of major trills or notes occurring in passages, thus making the notes resonant without requiring the tone holes to be made any larger than is necessary to secure the greatest purity of tone when vented; enabling all the holes below the tone hole to be opened for the purpose of securing resonance in the lower and middle registers where it is desirable; opening a tone hole after the same has been closed by pressure of the finger upon one key, by pressing with another finger on another key, and compounding the motion of two fingers and keys to operate one stopper, thus permitting control of the same stopper by two fingers; and, making two fingers control three holes anywhere on the instrument, and control such holes perfectly with the notes resonant.

In the accompanying drawings I have illustrated several embodiments or modifications of my invention, all embodying the same fundamental principles, operable to secure the effects above suggested, but showing some of the various ways in which these principles may be worked out for special purposes. In the drawings, Figure 1 represents on an enlarged scale a piccolo showing my invention applied in different forms to the key mechanisms.

Fig. 2 is a cross section on line 2—2 of Fig. 1.

Figs. 3 and 4 are cross sections taken on the line 4—4 of Fig. 1 showing the mechanism in different positions.

Fig. 5 is a plan view of one of the mechanisms illustrated in Fig. 1.

Figs. 6, 7, and 8 are cross sections taken on lines 6—6, 7—7, and 8—8, respectively, of Fig. 5.

Figs. 9, 10, and 11 are views similar to Fig. 8 showing the mechanism illustrated therein in different possible positions.

Fig. 12 is a perspective view of another modified form of my invention.

Fig. 13 represents a central transverse section of the mechanism shown in Fig. 12.

Fig. 14 is a plan view showing a special form of my invention applied as a modification of the Boehm flute.

Fig. 15 is a cross section on line 15—15 of Fig. 14.

Figs. 16 and 17 are respectively a plan view and an elevation of still another modification.

Fig. 18 is a cross section on line 18—18 of Fig. 16.

Fig. 19 is an elevation showing another modification of my invention adapted for controlling the octave keys of an oboe.

Figs. 20, 21, and 22 are cross sections on line 20—20, 21—21, and 22—22, respectively, of Fig. 19.

Fig. 23 is an elevation of a lever which forms a part of the mechanism illustrated in the last named four figures as seen from the side next to the body of the instrument.

Figs. 24 and 25 are plan views showing different parts of another instrument and representing the application of my invention to the control of all the keys and stoppers of the instrument.

Fig. 26 is a longitudinal section on the axial line of several of the pivoted parts of said instrument.

Figs. 27 to 43 inclusive are cross sections taken on the lines 27—43 inclusive, respectively, on Figs. 24 and 25.

Fig. 44 is a plan view of an instrument to which are applied other modifications of the invention illustrated in Figs. 24 to 43.

Fig. 45 is an elevation of the instrument shown in Fig. 44.

Figs. 46, 47, 48 and 49 are cross sections on the lines 46, 47, 48 and 49, respectively, of Fig. 44.

Figs. 50 and 51 are perspective views of details of the mechanism shown in the last six figures.

Fig. 52 is an enlarged view of the right hand end of Fig. 44.

Fig. 53 is a similar view of the right hand end of Fig. 45.

Figs. 54, 55, 56, and 57 are sectional views taken on the correspondingly numbered cross lines of Fig. 52.

The same reference characters indicate the same parts in all the figures.

It has been my aim in making the foregoing illustrations to show many of the forms in which the fundamental idea of my invention may be embodied. Fundamentally the invention is simple and consists first in a means for compounding the motion of two fingers of the player to produce motion of a stopper; second, in providing a mounting for a stopper of such character that the stopper may be moved in one way by one finger and may be otherwise moved by another finger without requiring any further or other movement of the first-named finger; and in the provision of means by which these effects may be secured and the key system be an open one, without requiring the provision of opposed springs acting in connection with the same stopper or key one spring normally over-balancing the other.

In Figs. 1 to 11 inclusive I have shown the application of the essential principles of my invention in various forms of mechanical embodiment to a wood-wind instrument, selecting for the purpose of concrete illustration the piccolo as the particular instrument but without intending thereby to imply that the invention is limited to that or any other particular instrument. In these figures 1 represents the body of the instrument, which is a tube having a gradually tapering conical bore, with lateral holes which pass from the bore through the walls of the tube. One of the key-mechanisms which includes two finger pieces and a stopper, adapted to control three holes, consists of the finger pieces 2 and 3, which are here shown as rings adapted to surround the lateral holes H and J, respectively. Said rings are carried by arms 4 and 5, respectively, which are both rigidly connected to a sleeve 6, which is pivoted upon the pin or screw 7 held in posts 8 and 9. The arms 4 and 5 carry a pivot pin or rod 10 upon which fits rotatably a sleeve 11 having a hook 12. To the sleeve 11 is fixed rigidly an arm or lever 13 carrying a stopper 14 which is adapted to stop one of the tone holes, which as here shown is the hole between the holes H and J. Lever 13 has an oppositely extending arm which is provided with stops 15 and 16 lying above and below the sleeve 6, respectively, and adapted to contact with said sleeve to limit pivotal motion of the stopper lever, but far enough apart to permit sufficient movement of said lever. The stop 15 is also a finger piece adapted to receive pressure from the player's finger to raise the stopper.

It will be understood from the foregoing that when either the hole H or the hole J or both is stopped by the player's finger, pressure is also applied upon the finger piece 2 or the piece 3, respectively, thereby swinging the unit structure consisting of the arms 4 and 5, sleeve 6 and pin 10 toward the body of the instrument and bringing the stopper 14 to a seat over the tone hole beneath it. While the parts are in this position the stopper may be raised by pressure applied by another digit on finger piece 14, without requiring either of the other fingers to be removed or shifted. For convenience of description the structure consisting of the parts 4, 5, 6, and 10 will be considered and called a "holder" or "carrier", and the lever or arm 13 will be called a "floating piece" or "member" which carries a stopper and of which the sleeve 11 is the hub or pivot bearing. The floating piece is held with its stop 16 against the sleeve 6 by means of a spring 17 which is mounted in the arm 5 and engages the hook 12. This spring has sufficient force to press the pad firmly over the hole and close the same hermetically whenever the carrier or holder is depressed as described. The spring has no effect in resisting the movement of the holder, however, since its action and reaction are both applied only upon parts of the holder. The holder is normally held elevated by a spring 18, shown in Figs. 3 and 4, which is mounted in the post 8 and engages a hook 19 on the arm 5. The spring-imparted motion of this holder is limited by a stop arm 20 fixed to the holder and having a foot 21 adapted to make contact with the body of the instrument. Each spring performs its function independently of the other and particularly without impairment of force by the other. In other words there is no effect of balanced springs. It will be noted further that the floating piece 13 and its finger piece 15 are so located that the pressure applied by the player's finger on the piece 15 has no tendency to raise the holder or carrier, but that the tendency of such pressure is to produce a turning moment of the entire holder about its axis in the same sense as the moment produced by pressure on the pieces 2 and 3, and that finally when the motion of the floating piece is stopped positively by the piece 15 contacting with sleeve 6, the pressure subsequently applied has no effect to turn the holder in either direction. The particular feature is that at no time does the pressure applied to the finger piece 15 oppose or counteract that applied to the finger piece 2 or the finger piece 3.

An obvious modification of the mechanism just described is to replace the ring shaped finger piece 3 by a lever, a plate, or a segment of a ring adjacent to the hole J, so that the latter may be kept closed whenever such finger piece is held down, and without requiring the finger of the player directly to stop the hole. This modification would permit the same finger used in stopping the hole J to raise the stopper 14 by being slipped over upon the finger piece 15 in such a way as to maintain pressure on the arm 5 at the same time. It will also be clear after a consideration of other forms of the mechanism, hereinafter described, that a key or finger piece similar to keys elsewhere described in this specification might be provided to operate a second stopper for closing the hole J. In either modification as well as in the construction shown a major trill may be played on the note corresponding to the hole K next below the hole H by vibrating the finger which operates the piece 2, without touching the finger piece 15. The mechanism as shown provides means whereby either a minor or major trill may be played on the note corresponding to the hole H. A minor trill is performed by keeping the hole J covered and vibrating the stopper 14, while the major trill is performed by vibrating the finger piece 3, and causing the operating finger to close the hole J at every vibration. Then the entire carrier and floating piece are moved together, and both the hole J and the hole covered by the stopper are covered and uncovered in unison. For the purpose of illustration and not of limiting the invention to any particular instrument or to any particular location upon an instrument, it may be considered that the hole H is the G♮ tone hole, the hole covered by stopper 14 is the G♯ tone hole, the hole J is the A♮ tone hole and the hole K is the F♯ tone hole. The principles involved in the mechanism just described are embodied, with or without modification and additions in other forms of the invention hereinafter described.

Another form of the invention illustrated as being applied upon the same instrument consists of the finger pieces 22 and 23 and the stopper 24 for controlling the holes L, M, and N which may be considered for illustration as corresponding to the B♮ C♮ and C♯ tone holes, respectively. These finger pieces are also shown as rings, but they might as well be plates or stoppers, or indirectly connected with separate plates or stoppers, as suggested in connection with the finger piece 3. They are carried by arms 25 and 26, respectively, which are rigidly secured upon a sleeve 27 having a pivot bearing on a rod fastened in posts 28 and 29. The sleeve also carries rigidly a yoke or stirrup 30 in which is a pivot stud 31 (see Fig. 2) whereon is pivoted a lever 33 which carries the stopper 24, said lever being connected with a hub or sleeve 34, and being carried beyond the post 28 and offset into the line of the sleeve 27. On the offset end of lever 33 is mounted a finger piece 35 in the form of an anti-friction roll or sleeve journaled on a pin which projects from the lever in approximate alinement with the axis of sleeve 27. The rigidly connected parts 22, 23, 25, 26, 27, 30 and 31 constitute a pivotally mounted holder or carrier on which is pivotally mounted the floating piece 23 carrying the stopper 24. The entire holder is normally raised so as to uncover all the holes by means of a spring 36 fixed in the post 29 and bearing on a lug 37 connected with the arm 25. The floating piece is normally held down against arm 25, which constitutes a stop, by a spring 38 fixed to the holder and bearing against a hook 39 connected with the floating piece. A stop 40 opposite to the arm 25 limits the movement of the floating piece caused by pressure on the finger piece 35.

The essential principles of this mechanism are identical with those of the mechanism previously described. The stopper may be closed when either finger piece 22 or 23 is pressed upon and it is held closed hermetically by the spring 38, which however opposes no resistance to the movement of the mechanism as a whole. The independent relative movement of the floating piece enables the stopper to be opened while the hole on either side of it is closed. This stopper, floating piece, and its finger piece are also so arranged that the pressure of the finger on the finger piece 35 has no tendency to cause uncovering of either hole L or N. In this mechanism also the vibration of either 22 or 23 by one finger only, such finger being so placed as to close the hole beneath it when pressed toward the instrument body, causes two holes to be simultaneously opened and closed and thereby permits a major trill to be played, while by holding down the finger which acts on the finger piece 23 and vibrating the stopper 24 a minor trill may be played.

Such mechanisms as hereinbefore described may be applied to all the tone holes of an instrument and suitably interconnected by known means or otherwise, so as to permit major or minor trills to be correctly played on all the notes within the range of the instrument, with perfect truth and purity of pitch and tone. I have illustrated and will describe hereinafter ways in which it is possible to control all the tone holes by such mechanisms.

A group of three holes O, P, and K which for illustration may be considered as being the E♮ F♮ and F♯ tone holes, respectively, are controlled by three stoppers, two normal finger keys and a trill key. These parts are illustrated in the left hand portion of Fig. 1 and in Figs. 5 to 11 inclusive. In this mechanism the stopper 41 which controls the hole K is carried by an arm 42 which is secured to a sleeve 43, to which also is secured an arm 44 adapted to stop against the body of the instrument and having an offset foot 45. Sleeve 43 is mounted with free pivotal motion upon a rod $44^n$ which is itself pivotally mounted on the pointed studs $45^a$ and 46 held in the posts 47 and 48, respectively, and provides the bearing also for a long sleeve 49. Fixed to the sleeve 49 are the arms 50 and 51 (arm 50 being formed at the end as a finger piece or key $50^a$) which form part of a yoke or carrier hereinafter described; the arms 52 and 53 which form parts of another yoke or carrier, and an arm $53^h$ which has an offset foot portion 54 lying between the body of the instrument and the foot 45 of the arm 44. Secured upon the inner rod $44^n$, by means of pins or otherwise are a lever 55 having a finger piece 56; an arm 57 having an offset foot 58 between the body of the instrument and the foot 45, and a third arm 59. The latter arm is provided to receive the thrust of a spring 60 which is fixed in the post 47 and normally holds the rod so that the arm 57 bears against the body of the instrument and the key 56 is raised. The sleeve 49 is normally so held that the yoke arms 50, 51 and 52, 53 are raised and the foot 54 of arm $53^n$ is stopped against the body of the instrument, by a spring 61 which is fixed in the post 48 and bears against a hook or lug 62 fast to the sleeve 49. Similarly the sleeve 43 is normally held so that its stop arm 44 bears against the foot pieces 54 and 58, and the arm 42 with the stopper 41 is raised by a spring 63 fixed in the post 47 and bearing against a lug or hook 64 fixed to sleeve 43.

The yoke arms 50 and 51 carry a pivot rod 65 on which is pivoted a sleeve 66 carrying a floating piece in the form of a bell crank lever 67 to which the stopper 68 is fixed. Said bell crank lever or floating piece has an upwardly extending arm $67^a$ to which is pivotally connected one end of a link 69, the other end of said link being pivoted to an arm 70 which is fastened to a shaft 71. Said shaft is mounted between posts 72, 73 on pointed pivot screws fixed in said posts as shown by dotted lines in Fig. 5. The arm 70 extends far enough to act as a stop by bearing against the sleeve 49, against which it is normally held by the spring 74, fixed in post 72 and engaging a lug or hook 75 on the shaft 71. A lever 76, formed as a key or finger piece is secured to the shaft 71, and has a downwardly projecting web 76$^a$ adapted to limit the movement of the key by striking the tube 1. The yoke arms 52 and 53 hold the opposite ends of a pivot rod 77 on which is rotatably mounted a sleeve 78 which is connected to and forms part of a bell crank lever 79 carrying a stopper 80 and having an upwardly extending arm 79$^a$. The upstanding arm 79$^a$ of the floating lever 79 is connected by means of a link 81 and a pin or rod 82 with an arm 55$^a$ forming a part of the key lever 55. The parts are normally held in the positions shown in the sectional views Figs. 6, 7, and 8 with the stoppers and keys all raised.

The keys 50$^a$ and 56 control all three stoppers and may be manipulated so as to obtain the characteristic note of any of the three holes controlled thereby, with the hole properly vented. When both keys are raised the note produced is that characteristic of the hole K, which in the instrument illustrated is F♯, it being understood that the holes above this hole are closed. If key 56 alone is pressed the stopper 41 is closed through the action of key lever 55 in rotating rod 44$^n$ and swinging the arm 57 so as to act on the arm 44 and thereby swing the arm 42 and stopper 41 toward the tube 1. The same motion swings the floating piece 79 carrying the stopper 80 toward the hole O, but does not close that hole because the pivot 77 of the floating piece is normally held at such a height that the utmost possible movement of key 56 merely swings the pad 80 from the position shown in Fig. 8 to that shown in Fig. 9, in which it is not near enough to the hole O to stop the same. When the key 50$^a$ is pressed the two stoppers 41 and 68 are closed upon the holes K and P, respectively, stopper 41 being closed by the action of the arm 53$^n$ which is rotated by the sleeve 49 and which acts on the arm 44 in the same manner that the arm 57 acts. At the same time the yoke or carrier 50, 51 is moved toward the body of the instrument, carrying the floating piece 67 with it and pressing the stopper 68 upon the hole P. The normal position of stopper 68 is near enough to the instrument body so that the movement permitted to the key 50$^a$ is sufficient to bring the stopper against the instrument body, the floating piece being guided by the link 69 so that it bears squarely on the rim of the hole. At the same time the yoke or carrier 52, 53 carries the stopper 80 toward the instrument body but not into contact with the rim of the hole O because it is held back by the raised key lever 55 and link 81, in approximately the position shown in Fig. 10. If now the key 56 is also depressed the floating piece 79 is swung about the now lowered pivot 77 into the position shown in Fig. 11 where it stops the hole O. Thus it will be seen that either key 56 or 50$^a$ closes the hole K, that the key 50$^a$ alone closes both holes K and P and that the action of the two keys together closes all three holes. Hole P may be uncovered even though key 50$^a$ or both 50$^a$ and 56 are depressed, by pressing upon the trill key 76, the movement of which toward the instrument body turns shaft 71, swings the arm 70 outwardly, and pulls upon the link 69 to swing the floating piece 67 about its pivot 65 and raise the stopper. By vibrating key 56 when key 50$^a$ is depressed it is possible to produce the minor trill on D♯, that is, the note produced by the hole next below the hole O. By maintaining pressure on key 56, and vibrating key 50$^a$ alone the major trill on D♯ may be played because the motion of 50$^a$ opens and closes both pads 68 and 80 simultaneously, pad 80 being brought from the position shown in Fig. 9 to that in Fig. 11 upon every depression of 50$^a$. Each of these trills is accomplished by vibrating only one finger, and this finger in the case of the major trill operates two stoppers simultaneously. The trill key 76 is used to play the minor trill on E.

This key mechanism illustrates a means for compounding the motion of two keys to impart motion to a stopper, such means consisting of a four-bar linkage. The rigidly connected arms 50 and 51 form one of the bars of one linkage and the other three bars are composed of the floating lever arm 67$^a$, the link 69 and the lever 70. In the linkage operating the stopper 80, the rigidly connected arms 52, 53 form one bar and the other three bars are composed of the lever arm 79$^a$, the link 81 and the arm 55$^a$. In both of these linkages the operation of one finger produces a movement of the stopper independently of the motion produced by another finger, these motions in one case being opposed and in the other taking place in the same direction. The motion given to the trill key 76 by one finger withdraws the stopper affected from the position given it by the pressure of another finger on the key 50$^a$, while in the case of the stopper 80 pressure on two keys simultaneously is necessary to produce the full movement of the stopper. In the first case the motion of the two keys is compounded to open the stopper after closing it, and in the second case these motions are compounded to move the stopper from open to closed position and the reverse. This mechanism is one by which two fingers are enabled to control three holes perfectly with the production of resonant notes at each of the holes. Essentially the same mechanism is applicable to all the holes of a wood-wind instrument, and the application thereto in this manner has been illustrated in Figs. 24 to 43 inclusive of these drawings, later described. The position of the A♯ tone hole is indicated by a dotted ellipse in Fig. 1, to which the reference letter A♯ is applied. Such tone hole is not actually visible when the instrument is viewed from the position shown in Fig. 1, as it is on the rear side of the body. It is controlled by a simple stopper and finger piece of any ordinary character which is not linked up with any of the mechanisms heretofore described with which my present invention is concerned.

Figs. 12 and 13 illustrate a modification of mechanisms for controlling three holes by two finger keys, in which the motions of compounding are effected by cams instead of by links. In these figures 1 represents the body of the instrument as before and O and P and K represent holes corresponding to the similarly lettered holes in Figs. 1 and 5. For convenience of description it may be assumed also that the instrument is of the same description as that already described and that the notes produced at the holes O, P, and K are the same as already indicated. 83, 84, and 85 are the stoppers for these holes respectively, the first of which is carried by an arm 86 secured rigidly to a sleeve 87 which is mounted to rotate on a rod 88 which is pivoted on the pivot point screws mounted in the posts 89 and 90. Sleeve 87 has a spline or key 91 which fits a guideway in an outer sleeve 92, to be presently more fully described. Stopper 85 is carried by an arm 93 which is fixed on a short sleeve 94 pivoted upon the inner rod 88. Beside arm 93 is an arm 95 secured to the inner rod 88 and having its end offset to overlie lever 93. On the other end of rod 88 is a lever 96 carrying a finger piece or key 97.

The stopper 84 is secured to the finger piece or key 98, conveniently as an integral part thereof, and said finger piece 98 has a lug 99 adapted to press upon the stopper 85. Thus when either key 97 or 98 is depressed the stopper 85 is closed, this result being effected from the key 97 through the inner rod 88 and the offset arm 93, and being effected by the key 98 directly through the lug 99. Depression of key 98 also closes stopper 84, thereby at the same time closing both holes K and P.

The two keys together control the stopper 83 by compounding their motions as follows. The arm 100, which carries the key 98, is pivoted on the rod 88, and has connected to it by an arm or web 101, a cam segment 102 having a helical end face 103. A similar and oppositely disposed cam segment 104 is connected with the key lever 96 by a web 105 and has a helical end face 106 making an angle with respect to the common axis, which is approximately equal and opposite to the angle of the face 103. The sleeve 92 is connected by arms 107 or otherwise with an intermediate cam segment 108 having oppositely inclined end surfaces which are arranged to abut against the surfaces 103 and 106, respectively, and to have smooth sliding contact therewith. The intermediate segment 108 is in effect a wedge between the two flanking inclined cams 102 and 104. When the two cams are moved in unison in the same direction, by simultaneous depression of the keys 97 and 98, the intermediate cam 108, being unable to move endwise, is compelled to swing about the axis, thereby turning sleeve 92 and oscillating the stopper 83, through the spline 91, far enough to close this stopper. Normally the keys 98 and 97 are raised until they are stopped by their respective cam segments coming into contact with the body of the instrument. When either key alone is depressed it moves the intermediate cam segment 108 both rotatably and axially. Springs 109 and 110 fixed in a post 111 bear against the stopper levers 93 and 86, respectively, to hold said stoppers normally away from the body of the instrument.

It will be appreciated that the mechanism shown in Fig. 12 embodies the essential principles hereinbefore described in that it provides means by which the motion of two keys is compounded to produce movement in a stopper, that it enables three stoppers to be controlled by two keys, and that it enables the stopper which is controlled by the two keys to be vibrated for making a trill by manipulation of either key.

Figs. 14 and 15 illustrate a special modification of the four bar linkage mechanism designed to be applied to the Boehm flute for playing the trill from C♮ to D♮ in both registers, in perfect tune, with the same trill key. Here R and S represent the C♯ and D♮ tone holes respectively. 112 is a finger piece carried by an arm 113 secured to a sleeve 114 pivotally mounted between post 115 and another post not shown, and normally elevated by a spring 116 fixed to the post 115 and bearing on a hook 117 of the sleeve. A second arm 118 is connected with sleeve 114 and between the two arms there is a semi-cylindrical socket or bearing 119 in which a bar 120 is fitted so that it may turn. This bar carries an arm 121 connected to the stopper 122 for the hole R, and it has another arm 123 connected by a link 124 with an arm 125 fixed on a sleeve 126 pivoted on a rod 127 and having fixed to it the stopper 128 for the D♮ hole S. Also fixed to the sleeve 126 is a finger piece or trill key 129. The latter is normally raised and the stopper 128 normally closed by a spring 130 acting against a hook 131 on the sleeve. In playing the major trill from C♮ to D♮ the key 112 is held down and the key 129 is vibrated, thus opening and closing both stoppers in unison, and securing perfect venting of the D♮ hole S, thereby playing the note D♮ in perfect tune. In trilling from C♯ to D♮ the trill key 129 is again vibrated, but the key 112 is released.

Figs. 16, 17 and 18 illustrate the embodiment of the principles herein described in a lever mechanism. As before, the body of the instrument is designated 1 and the three holes shown are designated O, P, and K, as in Fig. 5, it being assumed for the convenience of description that the notes produced by uncovering these holes are respectively E F♮ and F♯. The stopper 132 for the hole K is carried by an arm 133 which is fixed to the sleeve 134, the latter being freely pivoted on an inside rod 135 which is pivoted between posts 136 and 137. The said sleeve also carries an arm 138 having oppositely extending foot portions 139 and 140. A second sleeve 141 is pivotally mounted on rod 135 and carries the arm or lever 142 to which finger key 143 is connected, and also carries the arms 144 and 145, the latter having an offset portion 146 lying between the body of the instrument and the foot 140. A third sleeve 147 is also pivoted upon the rod 135 and carries the lever 148 of the stopper 149 for the hole O. It also carries an arm 150 to which is pivoted, on a fulcrum pin 151 a lever 152, having a hub portion 153 at or near its center and adjustable stop screws 154 and 155 in its ends. One of such ends overlaps the arm 144 and its stop screw 154 is pressed upon by said arm, and the other end carrying the stop screw 155 overlaps and is pressed upon by an arm 156 secured to the rod 135. Also secured to said rod is an arm 157 carrying the finger piece or key 158. The arms 156 and 157, may, if desired, be made in one piece or otherwise connected. These arms are at one end of rod 135. Rigidly secured to the other end of this rod is an arm 159 having a foot portion 160 which underlies the foot 139 of arm 138.

The stopper 161 for the hole P is connected to an arm 162 which projects from a block 163 having a bearing in the socket 164 which is connected with the lever 142, the mounting being substantially as shown in Figs. 14 and 15. An arm 164ᵃ which projects from the block 163 is connected to a link 165 which latter is pivoted to an arm 166 fast to the sleeve 167, which is pivotally mounted on a rod or screw passing between posts 168 and 169, and carries also a trill key 170.

The combination is essentially like that shown in Fig. 5, the two keys 143 and 158 serving to control the three stoppers, and the trill key 170 being operable to open the stopper 161 when the key 143 is depressed. Key 158 acts through the pivot rod 135, arms 159 and 138 and sleeve 134 to close the stopper 132 alone. Key 143 when depressed acts to turn the sleeve 141 and arm 145, thereby oscillating arm 138 and sleeve 134 so as also to close stopper 132. It also directly closes the stopper 161 in the same manner as described in connection with Figs. 14 and 15. When both keys 143 and 158 are depressed simultaneously they move the arms 144 and 156 simultaneously, thereby pressing at the same time and in the same direction on both ends of the lever 152, displacing the fulcrum thereof, which swings the arm 150 and causes the sleeve 147 to turn far enough to close stopper 149. When either key alone is depressed only one end of lever 152 is displaced, and the resulting displacement of its central portion is not sufficient to close the stopper 149, or even so nearly close it as to affect the tone produced at the hole O. Thus by vibrating either key 143 or 158 while holding the other key down, the stopper 149 may be vibrated to produce either a minor trill or a perfectly vented major trill on the note next lower than that of the hole O, which in the instrument illustrated is the note D♯. By vibrating the trill key 170 the stopper 161 is opened and closed while the key 143 is depressed, to obtain a trill on the notes E and F♮. The keys and stoppers are normally held elevated by springs 171, 172, 173, and 174 which act on the sleeves 134, 141 and 147 and the arm 156, respectively, in a manner obvious from an inspection of Fig. 17. The sleeve 167 and trill key are acted upon by a spring not shown but which is essentially like the spring 130 in Figs. 14 and 15 and the spring 74 in Figs. 5 and 7, and acts to hold the pad 161 with a firm pressure against the seat when pressed toward the instrument by the key 143.

Figs. 19 to 23 inclusive illustrate the application of the lever mechanism principle to operate a double automatic octave key which is especially adapted for the oboe. In this class of instruments holes are provided which must be opened when certain notes are played. In these figures 1ᵃ represents the body of the instrument and 175, 176 represent such holes which are controlled by the stoppers 177 and 178, respectively. In playing all notes from G and below in the second register the hole 175 should be opened, while for playing notes above G the hole 176 should be opened and hole 175 closed. The stopper 178 for hole 176 is carried by an arm 179 having a sleeve which is fixed to a long rod 180 rotatably mounted in posts 181, 182, and 183, and also fixed to the rod is an arm 184 provided with a ring 185 which is adapted to surround one of the tone holes of the instrument, designated, for example, as A, when said tone hole is closed by the player's finger. The stopper 177 for hole 175 is carried by an arm 186 which is fixed to a sleeve 187 pivotally mounted on the rod 180. A second sleeve 188 is also pivoted on the rod and to it is secured a pivot pin 189 on which is fulcrumed pivotally a lever 190, the ends of which are connected with the arms 179 and 186 respectively, preferably being reduced as shown in Fig. 23 and being contained in holes in said arms. Also fixed to the sleeve 188 is a thumb key 191 which extends on the under side of the instrument body. A spring 192 is fixed in the post 181 and bears on a pin or hook 193 which is rigidly connected with the lever 190, the force of said spring being so applied as to tend to depress that arm of the lever which is engaged with arm 186. The tendency of the spring is to move the lever pivotally so as to close both stoppers 177 and 178 and to hold the thumb key away from the instrument body. When the note G and all notes below it are played the hole A is covered, and the player's finger which covers it also bears on the ring 185 and prevents the latter from rising. The same pressure causes the stopper 178 to close the upper octave hole 176, by acting through the rod 180 and arm 179. If at the same time the thumb key 191 is pressed upon, the lever pivot 189 is moved and the lever is also turned about its connections with the arm 179 as the fulcrum, raising the stopper 177 and uncovering the lower octave hole. When the hole A is uncovered, as it is when notes above G are played, the ring 185 is released, and if the thumb key is still pressed, the spring 192 causes the lever to turn about its pivot 189 as the fulcrum to close the lower octave hole and open the upper one. Thus when neither finger piece, (under which term I include both the ring 185 and the key 191,) is pressed upon, both stoppers are closed; when both finger pieces are pressed upon the stopper 177 is opened; and when only the thumb key 191 is pressed the stopper 178 is opened. Here there is found the combination of two finger pieces and a yielding actuator (the spring 192) for controlling the operating of two stoppers. The condition obtains that the motion of a part, namely the stopper 177, is compounded from a positive motion imparted by an operating member (the key 191) and yielding motion imparted by a second member (the spring 192), and that means, consisting of the finger piece 185 and the parts connected thereto, are provided for overcoming the effect of the second member. The compound effect of the positive motion and the yielding motion imparted by the key 191 and the spring 192, respectively, is to close the stopper 177 and open the stopper 178 and the effect upon both these stoppers is overcome and reversed by the operation of the third member 185.

Figs. 24 to 43 inclusive illustrate the comprehensive and complete application of the essential principles found in the mechanisms hereinbefore described to a musical instrument of the type indicated whereby to control all the tone holes by combinations of keys and stoppers so arranged that a sufficient number of the stoppers may be controlled by the compound action of two keys to enable all sequences of notes to be played with ease and to enable major and minor trills to be performed upon each note in perfect tune and with complete resonance and purity. The arrangement illustrated is adapted to be applied to any of the forms of wood-wind instrument so far as I am aware. In these drawings I have illustrated two joints of the instrument, Fig. 24 showing the upper joint and Fig. 25 showing the lower joint. By the terms "upper" and "lower" distinguishing these joints I have reference to the relative positions of the joints with respect to the mouth of the player, the upper joint being nearer to the player's mouth than the lower joint. The relative terms "upper" and "lower" have the same significance when applied to the tone holes of the instrument, to the stoppers for controlling such tone holes, and to the keys or finger pieces. The instrument here shown is a strictly open key instrument in which all the stoppers, with exceptions hereinafter noted, are normally held elevated. The drawing, however, does not show said stoppers and the keys in the normal position, but represents all of those parts which are moved when pressed upon as being in the pressed condition, so that all of the tone-holes are represented as being closed, a condition which does not occur in practice except when the lowest note in the register of the instrument is produced. Inasmuch as the purpose of these particular drawings, that is, Figs. 24 to 43 inclusive is to show a possible mode of applying the principles of my invention to any wood-wind instrument, I do not in the following description of construction limit the construction to any particular instrument. In the description of operation further on I have suggested that certain of the tone holes may be considered as being so located as to produce notes of certain pitches, but this is done merely for the purpose of convenience of description and not with any limiting significance. The pitches of the tone holes might be anything other than those suggested.

The body portion of the upper joint shown in Figs. 24, 26 and 27 to 37 inclusive is designated $1^b$, while the body of the lower joint shown in Figs. 25 and 38 to 43 inclusive is designated $1^c$. The key mechanisms, being specifically different in details of construction from those shown in the preceding views, have their own distinguishing reference characters. A description in detail of this embodiment of the invention follows.

A rod or shaft 195 is pivoted at its ends between posts 196 and 197 on the conical end of a screw 198, in post 196, and on the end of a long screw 199, which passes through post 197 and also through a third post 200. Shaft 195 carries on its upper end, an arm 201, to which is attached the stopper 202 for the highest tone hole $H'$ of the instrument and a lever 203 and on its lower end, a lever 204. Lever 204 has an offset end which is overlapped by the oppositely offset end of a lever 205 carried by a sleeve 206, which is pivoted on the screw 199 between the posts 197 and 200 and carries a key $K^4$ and a stop 207 to prevent key $K^4$ from turning over backward.

Parallel to shaft 195 is a screw pin 208, mounted in posts 209 and 210, whereon are pivotally mounted the hubs or eyes 211 of two arms 212 which are rigidly fastened to a finger piece or key 213. The arms 212 and key 213 form a yoke in the arms of which is mounted a pivot pin 214 whereon the lever or floating piece 215, carrying the stopper 216 for the second tone hole $H^2$ is carried and is adapted to turn. Said floating piece 215 carries an arm 217, which is connected by a link 218 with an arm 219, carried by a short sleeve 220 having a second arm 221, and being pivoted on the pin 208 between the yoke arms 212, said arm 221 being connected by a link 222 with the arm 203 on shaft 195, previously described. A construction which I consider suitable for the links 218 and 222, and also for duplicate or equivalent links which I use in other parts of the key mechanism of the instrument and will presently describe, is to provide each link with integral studs 223 at or near its opposite ends, which are adapted to pass through eyes in the arms or levers (as 203—221, 217—219, etc.) coupled by the link and to protrude at the opposite sides of such arms from the link. The link is secured in connection with the arms by a single key pin 224 which passes through holes in the protruding ends of the studs and has its ends bent over to clench them.

A spring 225 extends from the post 210 and bears on the hook 226 of one of the yoke arms 212, tending to hold the key 213 elevated as far as permitted by the stop 227, which is rigid with the key yoke and is arranged to stop against the tube of the instrument. A spring 228, extending from the post 209 acts on the hook 229 which projects from sleeve 220 (as shown in Fig. 28) and through sleeve 220, arm 221, link 222, and arm 201 to press the stopper 202 against the body of the instrument, closing the tone hole under it, and to raise the key $K^4$. The same spring acts through link 218 to press the stopper 216 toward the body of the instrument, but is prevented, both by the stopper 202, and by the fact that the pivot pin 214 is elevated, from causing stopper 216 to close the hole $H^2$ under the latter when key 213 is in the normal raised position.

The keys 213 and $K^4$ both control the stopper 216, the one to close it, and the other to open it while the first is depressed. If key 213 is depressed while $K^4$ remains raised, stopper 216 is closed upon the hole under it; and if $K^4$ is then depressed so as to raise stopper 202 by rotating shaft 195 through the overlapping levers 205 and 204, it also raises stopper 216 through the four-bar linkage described, which swings the stopper lever 215 upwardly about pivot 214. Thus, when stopper 202 is raised, stopper 216 is raised also, whether key 213 is depressed or not, uncovering the hole next below the tone hole opened by 202, and bringing about the condition essential for the production of a tone resonant, clear, and true to pitch.

The third tone hole $H^3$ is controlled by a stopper 230 on a lever or floating piece 231 having a hub 232 which is pivoted on a pin 233 and is furnished with a lever arm 234. Pin 233 is carried by a yoke consisting of arms 235 and 236 which are mounted and fastened on a sleeve 237 pivoted on the rod 208, and are rigidly connected by said sleeve and the pin 233. A lug 238 on the yoke arm 212 of key 213 overlies arm 235. Arm 236 is connected to or forms a part of a sleeve 239 which is fixed upon the inner sleeve 237, and has an arm 240 provided with a lug over which lies a lug 241 fixed on the side of a lever 242, which carries the stopper 243 for the fourth tone hole $H^4$. Pivoted on pin 208, or rather, on sleeve 237 between yoke arms 235 and 236 is a sleeve 244 provided with arms 245 and 246. Arm 245 is connected by a link 247 with an arm 248 on a sleeve 249, surrounding and rotatable on a reduced part of the shaft 195, and arm 246 is connected by a link 250 with the lever arm 234 of the floating piece 231. An arm 251 is fixed to sleeve 249 and carries a key $K^5$. A spring 252 mounted in post 209 engages a hook 253 on sleeve 239 and tends to raise yoke 235—233—236 and thereby to elevate the fulcrum or pivot 233 of the floating piece 231, while a spring 254 mounted in post 210 presses on a hook 255

(Fig. 29) on sleeve 244 and tends to turn the stopper 230 downwardly about its pivot, and to raise key $K^5$. A stop 256 on sleeve 249 is located so as to contact with the body of the instrument and prevent spring 254 from moving the stopper 230 so far as to close tone hole $H^3$, or so nearly closing it as to affect the quality of tone produced at such hole when the yoke 235—236 is raised.

When the yoke 235—236 is depressed, and $K^5$ is left elevated, stopper 230 is closed, and when $K^5$ is pressed, this stopper is raised. Pressing $K^5$ when the yoke is raised merely opens the stopper more widely without effect on the production of the tone at the tone hole $H^3$. The floating piece is in effect a bell-crank lever of which the fulcrum is the pin 233, and the arms are 231 and 234. Movement of the yoke shifts the fulcrum and moves the bell-crank bodily to close and open the tone hole, and movement of key $K^5$ swings the bell-crank about its fulcrum. Essentially the same thing is true of the floating piece 215—217 carrying the stopper 216 of the tone hole $H^2$.

The arm 242 for the stopper 243 of the fourth tone hole $H^4$ is fixed on a shaft 257 pivoted between posts 210 and 258 on the pointed ends of screw rod 208 (previously described) and of a similar rod 259 which is threaded through the post 258, and the other end of which is mounted in a post 260. An arm 261 is fixed to shaft 257 and overlaps an arm 262, fixed to a sleeve 263, which surrounds and turns on the screw rod 259. An arm 264 carrying a key 265 has a hub 266 and is also fixed on this sleeve by means of this hub. Depressing key 265 is thus effective to swing arm 262 outward, carrying with it the arm 261, and thus to turn shaft 257 and close stopper 243. A key 267, connected to a sleeve 268 which is pivoted on shaft 257, extends partly over the stopper arm 242 and, when depressed, bears on a lug 269 (Fig. 31) on said arm. Thus either key 265 or key 267 is effective to close the stopper 243 of the tone hole $H^4$; and these same keys, and also key 213, close the stopper 230 of the tone hole $H^3$ through the lug 241 or the lug 238 respectively. Stopper 243 is the stop which limits the motion of either key 265 or 267. The stopper is raised by a spring 270 mounted in post 258 which bears on a lug 271 of the arm 242 (Fig. 31) and key 265 is raised by a spring 272 mounted in post 260, bearing against a hook 273 of the hub 266, until stopped when the arm 262 comes in contact with the body of the instrument.

The stopper 274 for the tone hole $H^5$ is carried by a floating lever 275, fulcrumed on a pin 276 mounted in the arms 277—278 of a third yoke, which arms are connected by a tie bar 279 (Fig. 32) as well as by the pin 276 and are pivoted on the shaft 257. The hub or sleeve of yoke arm 277 carries a downwardly projecting lever arm 280 (Fig. 32) which laps over at its end the end of a lever arm 281 fixed to the hub of finger key 267; and the hub of yoke arm 278 carries a similar lever arm 282 (Fig. 26) which overlies a lever arm 283 secured to the finger key 284. Thus the stopper 274 may be closed upon its tone hole by depression of either key 267 or key 284. The stopper 274 is normally held elevated by a spring 285 mounted in post 258 pressing against a lug 286 (Fig. 32) of the yoke arm 277, which raises the yoke and also the keys 267 and 284 until the levers 281 and 283 come to bear against the body of the instrument. The floating lever 275 has an eye 287 forming a short arm which is connected by a link 288 to an arm 289 fixed upon a sleeve 290, which is pivoted on the rod 257 and carries an arm 291 equipped with a thumb key $K^8$. This thumb key serves to raise the stopper 274 when either key 267 or 284 is pressed down, by drawing back the arm 289 and link 288 and turning the floating lever 275 about its fulcrum 276. A spring 292 mounted in post 210 acts on a hook 293 on sleeve 290 for raising the thumb key and swinging the floating lever 275 as far toward the body of the instrument as permitted by a stop 294 (Fig. 32).

The stopper 295 for the sixth tone hole $H^6$ is similarly controlled by the key 284 and thumb key $K^8$ (but not by key 267), being carried by a floating lever 296 fulcrumed on a pin 297 carried by a yoke 298—299—300. 298 is the arm to which the finger piece of key 284 is fastened, and 299 is a cross tie rigidly connecting it with the arm 300, both arms being pivoted on the bar 257. It is the arm 298 of this yoke which carries the lever arm 283, previously described, and it lies beside the arm 278 of the third yoke. A spring 301 mounted in post 210 bears on a lug 302 (fixed to the arm 300) and tends to hold the key 284 and the floating lever 296 and its stopper pad 295 in the normal raised position. An arm or lug 303, forming part of the floating lever 296, is connected by a link 304 with an arm 305 on a sleeve 306, and the latter is rigidly connected to the sleeve 290 carrying the thumb key, by a tie 307 which bridges the arms 278, 298, of the adjacent yokes.

A stopper or pad 309, provided for controlling the seventh tone hole $H^7$, is mounted on a floating lever 310 which is pivoted on a pin 311 carried by a yoke composed of the arms, 312, 313 (which are pivoted on the sleeve 263 surrounding the rod 259) and a cross tie 314 (Fig. 35). The hub or sleeve 315 of arm 312 carries a rigid lever arm 316 (Fig. 33) which overlaps the end of a lever arm 317 rigidly connected to the arm 300 of the yoke to which key 284 is connected. The levers 316, 317, and also the levers 261, 262, are shown in a somewhat diagrammatic manner at the side of the instrument body in Fig. 24 for additional clearness of illustration. Actually these levers are hidden in plan view. Thus depression of key 284 has the effect of depressing yoke 312—313 and seating pad 309 on the rim of the tone hole $H^7$. When 284 is released, the yoke is raised, and the tone hole opened, by a spring 318 mounted in post 260 engaging a lug 319 on the yoke arm 312 and turning said yoke until the lever arm 317 comes against the body of the instrument. A key $K^7$ serves to raise stopper 309 when key 284 is depressed by acting through an intermediate lever 320—323 which is pivoted on the sleeve 263 and has an upstanding arm 320 connected to an eye 321 of the floating lever 310 by a link 322, and has also an inwardly projecting arm 323. Key $K^7$ is fast to a sleeve 324, mounted to turn about the sleeve 249 on shaft 195, and to sleeve 324 is fixed an arm 325 having a lug 326 (see Fig. 35) which underlies lever arm 323. Thus, depression of $K^7$ raises arm 325, lug 326, and arm 323, and swings lever 320 backwardly, which pulls on link 322 to raise the stopper 309. Arm 325 is bowed to pass over the hub of floating lever 310 and give plenty of clearance for the movement of the latter when its yoke is raised, and it is continued toward the body of the instrument to provide a stop 327. A spring 328 fixed in post 358 presses on a hook 329 of lever 320 to hold the stopper toward its seat and raise the key $K^7$ as far as permitted by the stop 327. This spring is short and stiff to press the pad 309 firmly against its seat when the yoke 312—313 is depressed, for the depression of the yoke merely lowers the pivot of the floating stopper lever without applying positive pressure to the pad itself. For the same reason, the springs 228, 254, and 292, which press the stoppers 216, 230 and 274 and 295, respectively toward their seats, are made short and stiff. The spring 328 has additional work to do, as will presently appear, which is a further reason for making it relatively powerful.

The stopper 331 for the eighth tone hole $H^8$ is carried by a floating lever 332, having a hub or sleeve which is pivoted on a pin 333 fixed in the yoke 334—335—336 (Fig. 37), composed of the arms 334 and 336, which are fixed to the sleeves 337 and 338 respectively, and the rigid cross tie bar 335 (Fig. 37), which latter is also a stop. The sleeves 337, 338 are mounted to turn on the sleeve 263 to which the arm 264 of the finger key 265 is fixed, as above described. Fixed also to the sleeve 337 is an arm 339 carrying a roll 340 which lies under and may be pressed upon by a finger or projection 341 on the stopper 309. The sleeve 266 of finger key 265 carries a lever arm 342 which is connected to a lug 343 of the floating lever 332 by a link 344. Both the yoke, key, and stopper are raised and normally held elevated by the spring 345 fixed in post 260, which bears on the lug 346 of arm 339, and by the spring 272 (already described), which acts on the hook 273 of the key arm 264. In this particular mechanism the yoke and key both act in the same direction, and the conjoint action of both is necessary to close the stopper 331. That is, stopper 331 is not closed until both keys 284 and 265 are depressed, while it may be opened, even though these keys are depressed, by the key $K^7$, which raises stopper 309 and allows the arm 339 and yoke 334—336 to rise also.

*Lower joint*, (Figs. 25 and 38 to 43 inclusive).—Posts 348, 349 and 350 support a rod 351 on which between the posts 348 and 349 is pivoted a sleeve 352, to which are fixed an arm 353 carrying the stopper 354 for the tone hole $H^9$, an arm 355, and an arm 356. Arm 355 has a foot which underlies a foot on the lever 357 which extends from sleeve 338 of the upper joint, which is connected with yoke 334—336 carrying the floating stopper lever 332, previously described. Thus, when stopper 354 is depressed, by means presently to be described, the same effect on lever 332 is caused as is caused by depression of stopper 309. A spring 358, fixed in post 349, bears on a hook on the under side of arm 353 and tends to raise stopper 354.

Also pivoted on rod 351, or rather, on an inside sleeve 359 which surrounds rod 351, are sleeves 360, 361 and 362, which are rigidly connected by the yokes 363—364—365, and 366—367—368, respectively, and sleeve 360 carries an arm 369 having a finger key 370 which extends over stopper 354. Yoke 363—364—365 carries a pivot pin 371 on which is fulcrumed a floating lever 372 carrying the stopper 373 for the tone hole $H^{10}$, and yoke 366—367—368 carries a pivot pin 374 which is the fulcrum for a floating lever 375 carrying the stopper 376 for the tone hole $H^{11}$. Pivoted on a parallel axis 377 between posts 378, 379 (Figs. 38 and 39) is a sleeve 380 to which are fixed a key $K^8$, an arm 381, and a stop 382. The arm 381 is connected by a link 383 (similar to those already described) with an arm 384 on the floating lever 372. This arm differs from those previously described in that it projects down instead of up, but it is operated and acts in essentially the same manner. A spring 385 fixed in post 379 bears on a hook 386 of the key $K^8$, tending to raise the key until stop 382 comes to bear on the body of the instrument, and tending also to swing stopper 373 toward its seat, although without closing the tone hole under it, except when yoke 363—364—365 is depressed by depression of key 370. This yoke, and also yoke 366—367—368 and key 370 are normally raised by a spring 387, fixed to post 350, which presses on a lug 388 of yoke arm 365. The stop which limits the rise of these parts is the arm 389 (Fig. 40) which is fixed to the sleeve 362 and contacts with the body of the instrument.

Fixed to the inside sleeve 359 are an arm 390 underlying the arm 356 of sleeve 352, a sleeve 391 carrying a key with its finger piece 392, and an arm 393, the latter being clamped on the sleeve by a screw 394 passing through ears 395 of the split hub of this arm and being positively prevented from relative turning by the key 396, which is held between the ear 395 and enters a slot in sleeve 359. A link 397 connects arm 393 with the arm 398 of floating stopper lever 375. A spring 400, fixed to post 350, bearing on a hook 401 of key 392, raises the latter until arm 390 bears on the post 349, and tends also to raise the stopper 376.

Stopper 354 may be closed by pressing either on key 370, which bears directly on the stopper, or on key 392, which acts through the sleeve 359, arm 390 and arm 356. Depressing key 370 also closes stopper 373 by depressing yoke 363—364—365, when spring 385 causes it to be pressed firmly against the rim of the tone hole $H^{10}$. At the same time the yoke 366—367—368 is depressed, but stopper 376 is not closed because spring 400 holds it up. This stopper can be closed only when both keys 370 and 392 are depressed simultaneously. While 370 is depressed, stopper 373 can be raised by depressing key $K^3$. The floating levers 372 and 375 are bell crank levers each controlled by two keys, essentially like the levers 215, 231, 275, 296, 310 and 332, except that their operating arms 384 and 398 respectively, extend downwardly instead of upwardly, the instrument body being recessed at 402 and 403 to give room for their movement.

The stopper 404 for the tone hole $H^{12}$ is carried by an arm 405 having a hub or sleeve 406 which is pivoted on a rod 407 extending between posts 408, 409, and 410. Sleeve 406 carries a tail arm 411 and a hook 412 on which a spring 413 bears, tending to raise the stopper. The stopper 414 for the hole $H^{13}$ is fixed to an arm 415 which projects from a sleeve 416, also pivoted on rod 407. The same sleeve also carries yoke arms 417, 418, in which is mounted a pivot pin 419, and on the pin is pivoted the sleeve 420 of a floating bell-crank lever 421 which carries the stopper 422 for the hole $H^{14}$. A spring 423 bears on the hook 424 of the yoke arm 418 and tends to raise both stoppers 414 and 422. All three stoppers may be closed simultaneously by a key $K^1$ on an arm 425, which is secured to a sleeve 426 pivoted on the rod 407. Said sleeve is connected by a yoke 427 with a sleeve 428. Yoke 427 is arranged to bear on arm 405 of stopper 404, and an arm 429 on sleeve 428 overlies and bears on stopper 414. Thus depression of the one key $K'$ closes all three stoppers. Stopper 422 can be raised while the others are depressed, by pressing on key $K^2$, which is carried by an arm 430 fixed to a sleeve 431 which surrounds and turns on a pivot rod 432 between posts 433 and 434. This sleeve has an arm 435 connected by a link 436 with the arm 437 of the floating lever 421, which carries stopper 422, thus providing a means, essentially similar to the mechanisms heretofore described, by which movement may be given to the stopper lever about its pivot 419 in addition to and independently of the movement given by the yoke arms 417—418. A spring 438 (Fig. 42), by pressing on a hook 439 on sleeve 431 tends to hold key $K^2$ elevated and to press stopper 422 toward its seat.

Key $K^2$ also controls the stopper 404 when key $K'$ is raised. To serve this purpose, sleeve 431 has a wiper finger 440 which lies under the tail arm 411 of the sleeve 406 by which stopper 404 is carried, such wiper finger being raised by the spring 438 and acting in the normal condition, when neither key is pressed upon, to close stopper 404. Spring 438 is sufficiently stiff to overcome the spring 413.

A final key $K^6$, mounted on the upper joint of the instrument beside key $K^7$ is provided to enable the player to produce with the fourth finger of his left hand all the effects obtainable by manipulation of key $K'$. $K^6$ is formed on an arm 441 which projects from a sleeve 442 pivoted on a rod 443 (Fig. 37) held by the posts 444 and 445, and this sleeve has an arm 446 formed with an offset end which projects beyond the end of the upper joint. A sleeve 447 pivoted on a rod 448 held by posts 449 and 450 (Fig. 41) fixed to the lower joint, has an arm 451 formed with an offset end which overlaps the offset end of arm 446. Sleeve 447 also carries an arm 452 provided with an anti-friction roll 453 under an arm 454 rigidly united with arm 425 of key $K'$. When $K^6$ is depressed the arms 445, 451 and 452 are moved outward and arm 454 is raised, depressing $K'$ and turning sleeve 426 with the same effect as when $K'$ is pressed upon by the player's finger.

The application of the principle of my invention to the instrument last described enables each of the tone-hole stoppers, except 202, and 414, to be controlled by two keys, and so by two fingers of the player, and also enables three holes in any location to be controlled by two fingers. The keys 213, 267, 284, 265, $K^4$, 370, 392, $K'$ (or its alternate, K⁶) and K² are the normal finger keys necessary for the ordinary operation of the stoppers in playing sustained notes and passages; and the keys K⁸, K⁷, K⁵ and K³ are trill keys by which the stoppers under their control may be raised even though the normal keys for the same stoppers may be depressed. The normal and trill keys together make it possible to play a major or minor trill on any note, and nearly all major, as well as minor, trills may be played by vibrating only one finger. The system of key mechanisms and the fact that it is a strictly open key system secure perfect venting of all notes, whether the upper notes of major trills, or in passages. This makes the notes resonant without requiring the tone holes to be made any larger than is necessary to secure the greatest purity of tone when vented. In other words, my system enables sequences of notes to be played which cannot be played with old style instruments, and does this without sacrificing the tone qualities of the old style instruments, which are universally recognized as superior to the tone qualities of the open system instruments, such as the Boehm flute, which have heretofore been produced to overcome the mechanical deficiencies of the old style instruments.

For the purpose of brevity in the following description of the method of operating the keys so as to secure the effects of trilling above referred to, I will assume that the holes H¹ to H¹⁴ inclusive correspond to holes so arranged as to obtain the chromatic scale from upper D to lower C, respectively. The minor trill on lower C is accomplished by holding down key K¹ or K⁶ and vibrating K² to vibrate stopper 422, it being understood of course, that the normal finger keys 213, 267, 284, 265, 370, and 392 are all depressed. The major trill from C to D is made by vibrating K¹ or K⁶ alone, operating stoppers 422 and 414 together, leaving K² up to close stopper 404 (D♯ hole). The upper note of this trill is resonant because stopper 422 is raised and the C♯ hole is uncovered whenever K¹ is raised to raise stopper 414 and uncover the D hole.

Minor trill on C♯, vibrate K¹ and K² simultaneously with the fourth finger. When these keys are simultaneously depressed, the yoke 427 prevents 404 from opening, and the lever 435 acting through the link 436 prevents 422 from closing; while, when they are simultaneously raised, stoppers 414 and 422 are opened by the spring 423 and wiper 440 closes 404.

Major trill on C♯; hold down K² and vibrate K⁶.

Minor trill on D; leave K¹ up and vibrate K².

Major trill on D; leave K¹ up, and vibrate both K² and 392. It should be noted here that, in order to play D♯ and all notes above, K² should be depressed, and in the remaining description of operation, it is to be understood, in the absence of direct statement to the contrary, that K² is depressed whenever it is necessary that stopper 404 be open to vent an upper hole.

Minor trill on D♯; vibrate 392 alone, while 370 is depressed.

Major trill on D♯; hold down 392 and vibrate 370.

Minor trill on E; hold down key 370 and vibrate K³.

Major trill on E; vibrate key 370, 392 being released and raised.

Minor trill on F; vibrate key 392 while key 370 is raised; key 392 then vibrates stopper 354 through 390 and 356; or vibrate 370 and K³ simultaneously, with F released, as 370 then directly operates 354 without closing 373.

Major trill on F; vibrate 265 and 392 together, or 265, 370, and K³ together.

Minor trill on F♯; vibrate 265.

Major trill on F♯; hold down 265 and vibrate K⁷, which oscillates lever 325, and floating lever 310, vibrating arm 339 by finger 341 and thereby yoke 334—336 which carries pad 331; operating pads 309 and 331 together.

Minor trill on G; release 265 and vibrate K⁷; 284 being pressed.

Major trill on G; vibrate 284, K⁷ being released.

Minor trill on G♯; vibrate 284 and K⁷ simultaneously.

Major trill on G♯; hold down 284 and vibrate thumb key K⁸, which draws back and releases floating levers 275 and 296, with their pads 274 and 295, in unison.

Minor trill on A; vibrate K⁸; 284 being released.

Major trill on A; vibrate 267, K⁸ being released.

Minor trill on B♭; vibrate 265, 267 being released; or hold K⁸ and vibrate 267.

Major trill on B♭; hold 265 and vibrate 213.

Minor trill on B; hold 213 and vibrate K⁵.

Major trill on B; vibrate 213, leaving K⁵ free.

Minor trill on upper C; vibrate 213, holding down K⁵.

Major trill on upper C; hold down 213 and vibrate K⁴.

Minor trill on upper C♯; vibrate K⁴.

In this description of trill manipulations it is to be understood, without statement in each instance, that the keys for closing all the holes above those used in making the trills are depressed, and that those below are released, except key K², which is always depressed when necessary to vent an upper note, so as to open the D♯ hole.

It will be readily understood that the key mechanisms above described enable any three holes of the instrument to be governed by two finger pieces, and that in all cases where the action of two fingers is compounded to produce motion of a single stopper, the mechanism is essentially the four-bar linkage hereinbefore described. The moving parts are so acted upon by springs that all of the stoppers (except 202 and 404) are normally raised, (the exceptions noted being normally closed by springs) and those stoppers which are carried by floating pieces and are closed when their carrying yokes or holders are depressed, are further actuated by springs which press them firmly enough against the rims of their holes to close the holes hermetically, but without causing these latter springs to oppose the force of the springs which tend to raise the yokes and stoppers together. In the case of each group of two keys and a stopper, with linkage and a spring acting on the stopper, the condition is found that each stopper has a motion compounded from a positive motion imparted by an operating member or key through the yoke or carrier, a yielding motion with respect to the yoke or carrier imparted by a second member, which is a yielding member, namely the spring, and means for overcoming the effect of the yielding member or spring by the effect of a third member, which is the other key, whether a normal key or a trill key, which produces the other or further movement of the stopper independently of the movement produced by the first key, whether such further movement is in the same direction and in addition to the movement caused by the first key, or is in the opposite direction, as in the previously described forms, as hereinbefore noted.

Figs. 44 to 57 show a further modification of the invention applied to the upper joint of a musical instrument which is adapted to be used interchangeably with the joint shown in Fig. 24. It may be assumed for purposes of description that the instrument body shown in Figs. 44 to 57 is proportioned as that of a flute, and with that understanding the tone holes have been designated by reference letters corresponding to the musical notation of the notes produced at such holes when a sufficient number of holes below them are uncovered and the holes above are stopped. I desire to say again in this connection that my action in designating these holes by particular pitch characters has no limiting significance and does not exclude the application of the mechanisms shown to a clarinet, oboe, bassoon, or any other instrument of the woodwind type in which the holes may have other pitches than do the holes of a flute.

In the present modification I show different arrangements of a mechanism in which the outer end of the link acting on the floating bell-crank may have a yielding, non-positive motion imparted to it by one finger, which motion may in turn be completely prevented by another finger, after the manner of the old Barrett key. This is shown applied to enable the trill, F♯ to G♮ to be made with the first finger of the left hand on a strictly open key instrument having no hole duplicated; this drawing also shows a mechanism which, applied to a flute having bore and location and size of holes exactly like the Boehm, enables high G♮ to be fingered exactly the same as on the old system and high F♯ to be taken the same as G♮ but with the first finger of the right hand added, the use of a thumb key being immaterial. In the drawing, no thumb key is shown. The mechanism shown also automatically changes the size of the upper hole so that C♮ between the lines is true when taken with the first finger of the right hand only, and C♮ on the second ledger line is true when taken with the first three fingers of the right hand only. The addition of the first finger of the left hand gives in either case B♭, which produces a perfect and easily executed major trill on the last-mentioned note. On this joint, as well as on the one in substitution for which it is used, pressing with the first finger of the right hand does not close the hole beneath it unless at the same time the instrumentalist presses with the third finger of the left hand or one of the other fingers of the right hand. Each hole pierced in the body of the instrument is marked on the drawing with the tone which may be produced in the first or second register when said hole and a sufficient number of holes immediately below it are open. The hole which gives C♯ will be referred to as the C♯ tone-hole, etc.

Certain recesses are cut in the side of the body of the instrument for clearance for the inboard ends of the links and the lower arms of the floating bell-cranks referred to above. These will be evident without reference characters.

$p^1$, $p^2$, $p^3$, and $p^4$ are the posts of the upper row, into which are tightly fitted the pivot-point screws, $s^5$ and $s^6$.

$p^7$, $p^8$, $p^9$, and $p^{10}$ are the posts of the middle row, into which are tightly fitted the pivot-point screws, $s^{11}$ and $s^{12}$.

$p^{13}$, $p^{14}$, $p^{15}$, $p^{16}$, and $p^{17}$, are the posts of the bottom row. In these posts the shaft 641 fits freely, as will be described later.

In the drawings, all parts which tend to close holes by being pressed, are represented in the pressed positions.

$18^b$ is a plate for the first finger of the right hand. It is fixed to the simple lever $18^a$ and can touch no other part. $18^a$ is fixed to the hub $19^a$ which fits freely on the screw $s^6$. The stop $20^a$, also fixed to $19^a$, contacts with the side of the post $p^4$ to limit the upward motion of $18^b$. The arm $21^a$, also fixed to the hub $19^a$, is fixed to the right hand end of the tube $22^a$, to the left end of which is fixed the arm $23^a$ which, in turn is fixed to the hub $24^a$. Said hub $24^a$ is in alinement with the hub $19^a$ and pivots on screw $s^6$. A hook, $25^a$, (Fig. 48) is formed on the inner side of hub $24^a$. A lever $26^a$, fixed to the tube $22^a$ near the middle of the latter (Figs. 45 and 53) has pressed tightly into it the pin $27^a$, extending toward the right hand, and the pin $28^a$ extending toward the left. The pin $27^a$ has the small bayonet-lock pin $29^a$ pressed into it. All parts numbered in this paragraph are thus combined into a single rigid unit.

When $18^b$ is pressed, one side of the arm $23^a$ acts upon the lever 721 which will be described later. As this arm is part of a rigid unit whose resulting motion is limited by a stop, it serves to limit the motion of $18^b$ in the direction of the movement given it by the performer's finger.

$30^a$ is a spring, fixed in the post $p^4$, and acting upon the hook $25^a$, tending to raise finger piece $18^b$.

$31^a$ is a sleeve which fits freely on the screw $s^6$. It has fixed upon it the arms $32^a$, $33^a$, and $34^a$ which form a double yoke into which the screw $35^a$ is tightly fitted; the arm $36^a$, which has a wiper end adapted to act upon the roller 611 (subsequently described); the arm $37^a$ which is adapted to be acted upon by an arm on the mechanism of the right-hand joint, and which also serves as a stop by coming into contact with the body of the instrument; the arm $38^a$ having the adjusting screw $39^a$ which is adapted to be acted upon by the subsequently described arm 511; and the hook $40^a$. The middle arm of the yoke has a rigid extension in which are fixed the adjustable stop screw $41^a$ and the roller-pin $42^a$. The roller, $43^a$, mounted on the pin, $42^a$, enables the instrumentalist to close the G♮ and G♯ tone-holes by the first finger of the right hand only, by pressing on both $43^a$ and $18^b$ at the same time independently of other fingers, which is desirable in certain cases. $44^a$ is a spring fixed in the post $p^4$ and pressing the hook $40^a$.

$45^a$ is the pad for closing the G♮ tone hole. It is fixed in the cup $45^b$ which is made rigid with the arms $45^c$ and $45^d$ of the floating bell crank, and the short sleeve $45^e$ which fits freely on the screw $35^a$ and serves as a hub for the bell-crank. The lower arm of this bell-crank is pivotally connected to the pin $45^f$ on the inboard end of the link $45^g$. The hole, $45^h$, in the outboard end of said link fits freely on the pin, $27^a$, and is retained on the same by the bayonet-lock pin $29^a$. The hole in the link is grooved at $45^i$ to slip over said bayonet-lock pin $29^a$.

$46^a$ is the pad for closing the G♯ tone-hole, which is fixed relatively to $46^b$, $46^c$, $46^d$ and $46^e$, just as $45^a$ is fixed relatively to the correspondingly lettered parts, and movable relatively to the link $46^g$ and its parts just as $45^a$ is movable relatively to the link $45^g$; but the outer end of the link $46^g$ is differently operated, as hereinafter described.

The hole $46^h$ in the outer end of the link $46^g$ fits freely on the pin $46^j$ where it is retained by the bayonet lock pin $46^k$. The pin $46^j$ is fixed in the arm $46^l$, which is best shown in Fig. 51 having been omitted from Fig. 48 in order that the latter figure might show parts which would have been obscured if arm $46^l$ had been there shown. This arm has the spring $46^m$ attached to it by the screw $46^n$. The arm is fixed on the sleeve $46^p$ which fits freely on the screw $s^{12}$. $46^q$ and $46^r$ are the cork-faced stop-surfaces of the arm $46^l$, which contact upon either side of the sleeve $31^a$. The spring $46^m$ presses upon the body of the instrument, and the reaction keeps the stop $46^q$ in contact with the inner side of the sleeve $31^a$, unless a stronger force is applied to the arm $46^l$ in the opposite direction.

The arm $46^l$ shown in Fig. 51 is to be regarded as a typical arm such as is used in four different places on this drawing, wherever the same letters appear, regardless of the figures which are affixed. The direction in which all such arms face is best shown in Fig. 55, also in Fig. 46 in connection with the arm $108^l$.

$46^s$ (Fig. 48) is a curved arm to which is fixed, by means of the screw $46^t$, the spring $46^u$, which is so bent as to press normally against the stop or hook $46^v$ formed on the upper end of the curved arm $46^s$. This arm $46^s$ is fixed to the sleeve $46^w$, which is mounted on the rod 641 about the axis of which it is free to oscillate, within limits, one of which is determined by the contact of the cork-faced stop $46^x$ against the body of the instrument. Said arm is located in the same transverse plane of the instrument with the outer end of link $46^g$. The spring $46^u$, which is tapered in width, is adapted to bear on the link $46^g$ when arm $46^s$ is swung inward and is fitted in place in the curved arm $46^s$ under initial tension sufficient to overcome the spring $46^m$ when the spring $46^u$ is caused and allowed to press upon the outer end of the link $46^g$. The curved arm $46^s$ and all the other parts numbered in this paragraph are typical, and duplicates thereof are used in three other places on this drawing, wherever an arm corresponding to the arm $46^l$ is used. Arm $46^l$ is pivoted close to the instrument body on screw $s^{12}$ (Fig. 45) with its hook shaped end embracing sleeve $31^a$, and is pressed outward by its spring $46^m$, (Fig. 54) which bears on the instrument body, until stopped by the pad 46$^q$ (Fig. 55) contacting with sleeve 31$^a$. Pin 46$^j$ projects to the right from arm 46$^l$ and is connected with the outer end of link 46$^g$, (Fig. 55) which lies between the instrument body and spring 46$^u$ and in the path of movement of the latter.

The G♯ key, 47$^1$, is fixed to the sleeve 46$^w$, and extends over the instrument body so that when pressed upon, it moves the curved arm 46$^s$ inward. The stop for this motion is made by the contact of the key 47$^1$ upon the body of the instrument. If the plate 18$^b$ is simultaneously pressed, the pin 28$^a$ which is in the path of movement of arm 46$^s$, is prevented from moving, and so restrains the spring 46$^u$ from acting upon the end of the link 46$^g$; but if the plate 18$^b$ is not pressed, then pressure on the key 47$^1$ causes the spring 46$^u$ to press on the end of the link 46$^g$ and thereby move said link and raise the pad 46$^a$.

It is evident from the foregoing that both the G♮ and the G♯ tone holes remain normally open, being thereto actuated by the spring 30$^a$ which raises the key lever 18$^a$ by pressing against the hook 25$^a$ which is in rigid connection with said key lever as described, and by the spring 44$^a$ acting through the hook 40$^a$ on the sleeve 31$^a$ to which the arms 32$^a$, 33$^a$ and 34$^a$, carrying the roller 43$^a$ and the floating bell cranks to which the hole stoppers are fixed. The G♮ tone hole can be closed only by depressing key 18$^b$ and simultaneously either pressing upon roller 43$^a$ or acting upon either the arm 37$^a$ or the arm 38$^a$ in the same direction of rotation by the adjacent mechanisms which actuate said arms. This is because neither the movement of the yoke carrying the stopper 45$^b$ nor the movement of the key 18$^b$ is sufficient to close the stopper, but the simultaneous movement of both is necessary for this purpose. If, after both keys 18$^b$ and 43$^a$ have been depressed simultaneously, the key 18$^b$ is released, then the stopper 45$^b$ will be opened by reason of the arm 26$^a$ moving the link 45$^g$ bodily toward the tube and thus swinging the floating bell crank 45$^c$ 45$^d$ around the pivot 35$^a$.

Depression of key 43$^a$ is, however, sufficient to close the stopper 46$^b$ of the G♯ tone hole, because the link 46$^g$ is constantly held in its outermost position by the spring 46$^m$ of the arm 46$^l$, provided the latter arm 46$^m$ is left free, thereby holding the stopper 46$^b$ so near the tube that depression of the pivot 35$^a$ by means of the key 43$^a$ will close the hole. But this hole may be opened while the key and yoke are thus depressed, by pressing on the key 47$^1$, which acts through the sleeve 46$^w$ and arm 46$^s$ to press the spring 46$^u$ against the outer end of link 46$^g$. Spring 46$^u$ being more powerful than spring 46$^m$, as previously described, overcomes the latter spring and moves both the link 46$^g$ and the arm 46$^l$ until the stop 46$^r$ of the latter brings up against the sleeve 31$^a$. And the G♯ tone hole can again be closed while keys 43$^a$ and 47$^1$ remain depressed, by pressing on the key 18$^b$ which swings the arm 26$^a$ outward and presses the pin 28$^a$ against the spring 46$^u$, withdrawing the latter and allowing the spring 46$^m$ to move the arm 46$^l$ outward. At the same time the key 18$^b$ closes the pad 45$^b$. Vibrating the key 18$^b$ under this condition furnishes a convenient means for trilling F♯ to G♯.

It is to be noted that the connections from the keys 18$^b$ and 43$^a$ to the stoppers 45$^b$ and 46$^b$ are positive, by which I mean that there is no lost motion between either of the keys and either of the stoppers, whereby any motion of either key is transmitted into a corresponding motion of the stopper. These keys apply respectively the component elements of a compound motion to the stopper 45$^b$, so that movement of either key alone when the other is not pressed upon moves the stopper, but without closing the hole. Essentially the same thing is true as to the spring actuated arm 46$^l$ in connection with the key 43$^a$ and the stopper 46$^b$, since movement of either the arm or the key under any condition will move the stopper, while movement of the key when the arm 46$^l$ is pressed toward the tube will move, but not close the stopper, and movement of said arm away from the tube when the key is released will also move but not close the stopper. The importance of the feature here emphasized is that if there were any lost motion noise would be caused when the relatively movable parts come together, which would be intolerable amid the delicate sounds of a woodwind instrument, and would probably not be tolerated even in brass horns. The padded stopper is thus closed upon the hole without sound, while the movement given by either key to the stopper without closing it is also soundless. This result is secured by the positive character of the operating connections between the keys and the stoppers. The condition so pointed out is present in the other forms of my invention, embodying a plurality of keys and a stopper with a link connecting the stopper to one of the keys, hereinbefore and hereinafter described. The term "positive" as used at this point and in the claims which point out the feature here emphasized signifies simply a construction from which lost motion is eliminated, and has no other or further limiting significance.

48$^1$ is the cup which contains the pad for closing the A♮ tone-hole. It is fixed on the arm 49$^1$ which is fixed to the sleeve 50$^1$, which is in alinement with the screws $s^5$ and $s^6$ and moves freely on its axis. To the sleeve 50$^1$ are also fixed the arm 51$^1$ which acts upon the arm 38$^a$ as above described; and the arm 521 which has fixed to its end the plate 531 which lies conveniently to the third finger of the right hand. The under side of the arm 521 is cam-shaped like the arm 36ª, and acts upon the roller 651 to be subsequently described.

54ᵇ is the cup which contains the pad 54ª for closing the B♭ tone hole. It is fixed to the arm 551 which is fixed to the sleeve 561, which latter is free to move upon its axis. The cup 54ᵇ has fixed to it the short studs 571 and 581, the tops of which are cork faced to avoid noise and are capable of being acted upon so as to close the B♭ tone hole, by pressure upon (respectively) the plate 531 or the subsequently described plate 841. The hook 591 is also fixed to the sleeve 561.

601 is a spring, fixed in the post $p^3$ and pressing on the hook 591 thereby tending to lift 54ᵇ. Unless the plate 841 is pressed upon the stud 581, then the tension of this spring, reacting through the stud 571, also tends to lift the cup 481 which in the drawing is shown pressed upon the A♮ tone hole. If the plate 841 is pressed then certain other springs to be subsequently described cause the roller 651 referred to above to react upon the cam-shaped arm 531 and tend to lift the cup 481. The stop is made by the contact of the arm 511 and the post $p^3$.

611 is a roller, pivotally mounted in the yoke 621 of the arm 631, which is fixed to the sleeve 63ʷ (see Fig. 54). 63ʷ is pinned to the inner shaft 641 which turns freely in the posts $p^{13}$, $p^{14}$, $p^{15}$, and $p^{16}$ (Fig. 45). The roller 611 is acted upon by the wiper shaped arm 36ª, above described.

651 is a similar roller mounted in the yoke 661 of the arm 671. 671 is fixed to the long sleeve 106ʷ near its right end. 106ʷ turns freely upon the above described shaft 641, in the same manner as does 46ʷ, above described.

In Fig. 48 the arm 631 and its parts are concealed by the corresponding and substantially duplicate parts 671, etc.

It will be seen from what has preceded that the arm 671 is acted upon whenever the plate 531 is pressed, and also that the arm 631 is acted upon whenever the instrumentalist presses either 531 or one of the plates on the adjoining joint of the instrument (not shown in this drawing, see Fig. 25) which act upon the arm 37ª.

The arms 631 and 671 have functions similar to that of the key 471, namely to move certain curved arms similar to 46ª, which act upon arms similar to 46ⁱ. One of these last mentioned arms requires to be moved positively and independently for trilling B♮ to C♮. This is accomplished by means of the C trill key, 681, which is fixed to the short sleeve 691. 691 is pinned to the inner shaft 701 which turns freely on the pivot points of the screws $s^{11}$ and $s^{12}$.

711 is a similar inner shaft which turns freely on the pivot points of the screws $s^5$ and $s^6$. To its right end is pinned the lever 721, which is fitted with an adjusting screw 722 adapted to be acted upon by the arm 23ª. To the left end of the shaft 711 the short sleeve 731 is pinned. This sleeve has fixed to it the arms 741 and 751 which form a yoke into which are fitted the pivot screw 761 and the adjustable stop screw 771. The hook 781 and the arm 791 are made integral with the yoke-arm 751. 801 is the spring which presses the hook 781. It is fixed in the post $p^3$.

The arm 791, the inner side of which near its end is cork-faced, is adapted to be operated by the bent lever 811. 811 is fixed to the short sleeve 821 which turns freely on the inner shaft 711 and also has fixed to it the lever 831 and plate 841. The plate 841 lies convenient to the second finger of the left hand and is capable of pressing upon the short stud 581 so as to close the B♭ tone hole. The left end of the bent lever 811 terminates in the pin 851 which has a function similar to the pin 28ª.

861 is a bent lever like 811 fixed to the sleeve 731, and terminating in the pin 871 which is like 851. 861 acts upon the arm 881 which is fixed to the sleeve 891. The sleeve 891 also has fixed to it the arms 901, 911, and 921 (which form a double yoke), and the hook 931. 941 (Fig. 44) is a spring fixed in the post $p^2$ and pressing said hook. 951 (Figs. 44 and 46) is a stop screw essentially like the stop 41ª shown in Fig. 49, and is adjustably fitted into the arm 911 near the end of the latter, in such a manner that one end projects from the arm toward the body of the instrument. 961 (Fig. 46) is a pivot screw fitted immovably through all three arms of the yoke. 971 is a plate for the first finger of the left hand. Integral with it are the socket 981 for the cork pad 991; the arm 1001; the hub 1011; and the arm 1021 having stop surfaces at 1031 and 1041 adapted to contact with the top and bottom, respectively of the sleeve 891. The arm 1021 has a boss on its under side into which the spring 1051 is fixed. The free end of this spring presses against the under side of the arm 901 and the reaction therefore always tends to raise the plate 971, relatively to the yoke in which it is pivotally mounted, without in any way affecting the position of the yoke relatively to the body of the instrument.

Since all the forces tending to raise either the plate or the yoke are yieldable, it is evident from Fig. 46 that the C♯ tone hole will be fairly and squarely closed whenever the plate 971 is firmly pressed.

106ᵇ, 107ᵇ, and 108ᵇ are cups containing the pads for closing the B♮ C♮, and C♯ tone holes, respectively. Each is under control of a series of parts like 46ᶜ, 46ᵈ, 46ᵉ, 46ᶠ, etc., and the corresponding parts are similarly lettered, but to the letter is prefixed a number showing to which series it belongs. The pad 108ª is pierced by the thimble 108ˣ so that when the pad is pressed to its seat the C♯ tone hole is only half closed, unless the plate 971 is pressed.

The curved arms 106ˢ and 107ˢ are both fixed to the same sleeve, 106ʷ.

The sleeve 108ʷ is pinned to the inner shaft 641.

The arm 107¹ is pinned to the inner shaft 701 and may therefore be positively moved by the trill key 681, as well as being subject to the motion which the curved spring 107ᵘ may impart to it if not withheld by the pin 871.

It will be evident that the mechanisms illustrated in Figs. 44 to 51 embody the essentials of the four-bar linkage hereinbefore described, and also that these mechanisms provide means whereby two finger keys control any hole stopper. The mechanisms illustrated in the last named figures include, in addition to features embodying principles essentially the same as those hereinbefore explained, provisions for withholding the reversing effect produced yieldingly by one finger through the action of another finger. To take for illustration the group consisting of the keys 18ᵇ, 43ª, and 471, and the stoppers 45ᵇ and 46ᵇ, we find that depression of 43ª alone will close stopper 46ᵇ only; that pressing 43ª and 18ᵇ together will close both 46ᵇ and 45ᵇ, and that the latter may be vibrated to trill from F♯ to G♮ by vibrating 18ᵇ. Also that trill key 471 opens stopper 46ᵇ when 43ª is pressed upon, acting yieldingly through a spring 46ᵘ, which is of greater strength than the spring 46ᵐ, which tends to close this stopper when 43ª is depressed; and that depression of 18ᵇ, when this condition obtains positively opposes the spring 46ᵘ, making the latter inoperative, and allowing the weaker spring 46ᵐ again to close the stopper 46ᵇ. Thus vibration of 18ᵇ alone when both 43ª and 471 are pressed upon, enables the two stoppers 45ᵇ and 46ᵇ to be vibrated together. In this last explanation it is to be understood that 43ª is referred to as typical of any of the three means, which include also the arms 37ª and 38ª, which depress the double yoke 32ª—33ª—34ª, and that, as a matter of practice, one of these other means rather than 43ª would be pressed upon when the vibration of 18ᵇ, under the conditions last suggested, is effected. The point is, however, that the use of the yielding actuator enables a further and additional control to be had of the stopper which is affected thereby. The stoppers which are controlled by the levers 106¹, 107¹, 108¹, and springs 106ᵘ, 107ᵘ and 108ᵘ, respectively, are all capable of being operated in substantially the same way to secure equivalent effects. On account of the essential similarity of these various groups of mechanisms I have not considered it necessary to go more fully into detail in the description of the mode of operating other groups.

It is to be borne in mind that the springs shown in Figs. 44 to 48 and distinguished by the exponent character "u," and also the spring 192 of the automatic octave keys shown in Figs. 19 to 23, are of a radically different character from the needle-shaped springs shown in many of the other figures, such for instance as the springs 17, 36, 38 and the like shown in Fig. 1, in that they have the special purpose and capability of enabling one finger to overcome yieldingly the effect produced upon a stopper by another finger. In respect to the needle-like springs such springs may tend either to close or to open the stoppers with which they are respectively associated, and in either case the condition exists in which the motion of the stopper is compounded of the motions produced by a finger key, a spring, and a second key, as hereinbefore fully explained.

What I claim and desire to secure by Letters Patent is:

1. In a musical instrument, the combination of a body having lateral tone holes, a stopper for one of said holes movable toward and away from the same, manually operated means having an operating connection with said stopper for giving the stopper a definite motion, said stopper and said means being pivoted on different axes, and other manually operated means having an operating connection with the stopper for moving the same out of the position to which it is brought by manual actuation of the first-named manually operated means.

2. In a musical instrument the combination of a body having lateral tone holes, a stopper mounted on the body over one of said holes with provision for movement toward and away from the same, a plurality of finger pieces also mounted on said body and being movable toward and away from the same, connecting means from said stopper to one of said finger pieces for closing the stopper when said finger piece is moved toward the body, and connecting means between another finger piece and the stopper for opening the stopper when said other finger piece is moved toward the body and the first finger piece remains in the stopper-closing position, the stopper and the connecting means between the same and the second-named finger piece being located in a position where the force applied by the second finger piece tends to press the first finger piece toward the closing position.

3. In a musical instrument the combination with a body having lateral tone holes, a stopper for one of said holes movable toward and away from the same, a finger piece connected to said stopper for applying motion-producing pressure thereto when displaced from normal position, a yielding actuator connected for applying force yieldingly on the stopper in the direction to coact with said finger piece in producing a predetermined effect upon the stopper, a second finger piece, and means connected therewith for applying force to the stopper in opposition to the force applied by said yielding actuator, said last-named means being located in a position whence the force applied is transmitted to the first-named finger piece in the same general direction as that applied to the latter by the finger which operates it.

4. A musical instrument of the wood wind type comprising a tubular body having lateral tone holes communicating with the bore of said body and open at the exterior of the body, a stopper arranged to co-act with one of said holes for opening and closing the same, a finger piece movable toward and away from the body, said stopper being mounted on said finger piece with provision for movement relatively thereto, a second finger piece, and means for applying force from said second finger piece to the stopper to move the same relatively to the first finger piece.

5. A musical instrument of the wood wind type comprising a tubular body having lateral tone holes communicating with the bore of the body and opening externally of the latter, a plurality of finger pieces connected movably to said body, a stopper arranged over one of said tone holes and being movable into and out of engagement with the rim of said hole to open and close the same, a connection between said stopper and one of the finger pieces through which movement is imparted to the stopper from said finger piece, and a connection from the other finger piece to the stopper through which the latter finger piece imparts a different movement to the stopper, one of such movements causing the stopper to close the hole.

6. In a musical instrument, the combination of a body having lateral tone holes, a stopper for one of said holes, a floating piece carrying said stopper, a movably mounted holder for said floating piece, means for moving said holder and floating piece by pressure of one of the player's fingers, and means for moving said floating piece relatively to the holder by pressure of a finger, in a direction opposite to that in which it is moved by the first-named member.

7. In a musical instrument of the character described, the combination of a body having lateral holes, a stopper coöperating with one of said holes, a floating piece carrying said stopper, a pivotally mounted holder to which said floating piece is pivoted, means through which the pressure of a digit of the player may be applied to turn said holder about its pivot, and carry the stopper into closing position and means for applying pressure of a digit to turn the floating piece pivotally relatively to the holder into open position.

8. In a musical instrument the combination of a tubular body having lateral tone holes, a stopper located over one of said holes and movable toward and away from said body for closing and opening the hole, means normally holding the stopper away from said hole, a finger piece positively connected to the stopper and movable to advance the same part way toward the hole, and a second finger piece also positively connected to the stopper and movable to carry the stopper wholly into closing position with respect to the hole.

9. A musical instrument of the wood wind type comprising, the combination of a body having lateral tone holes, a stopper adapted to close one of said holes, a floating piece having a compound motion, with which said stopper is connected mounted on the body so that the stopper is movable therewith toward and away from such hole, a plurality of finger pieces, and connections between each of said pieces and said floating piece for transmitting one of the components of such compound motion from each finger piece to the stopper independently of the motion of the other finger piece.

10. A musical instrument of the wood wind type comprising, the combination of a body having lateral tone holes, a stopper adapted to close one of said holes, said stopper being mounted on the body and having a compound movement toward and away from such hole, a plurality of finger-operated members, and connections through which each of said finger-operated members is enabled to give one of the component parts of such movement to the stopper and the simultaneous movement of all said members is enabled to give the compound movement to the stopper.

11. A musical instrument of the wood wind type comprising, the combination of a body having lateral tone holes, a stopper mounted on said body over one of said holes and being movable to close and open the same, two operating members, and positive connections between both operating members and the stopper for causing simultaneous movement of both members to close the stopper, and to enable independent movement of either member, from the position occupied by such member when the stopper is closed, to open the stopper.

12. A musical instrument of the wood wind type comprising, the combination of a body having lateral tone holes, a stopper adapted to close one of said holes, a plurality of finger pieces, and connections between each of said finger pieces and said stopper, each of said finger pieces and its respective connections being arranged to give a different movement to the stopper from that given by the other finger piece, and each finger piece being operable independently of the other to vibrate the stopper while the other is pressed upon.

13. A musical instrument of the wood wind type comprising, the combination of a body having lateral tone holes, a stopper adapted to close one of said holes, a floating piece to which said stopper is connected, a manually operated member, connections through which operation of said member so shifts said floating piece as to place said stopper in closed position, a second manually operated member, and operating connections between said second member and the stopper for causing the second member to open the stopper while the first member remains in stopper-closing position.

14. In a key mechanism of the character described, a stopper for controlling a tone hole, a movable holder on which said stopper is mounted with provision for relative movement, means for so moving said holder as to cause the stopper to close the hole, and means for moving the stopper relatively to its holder to uncover the hole while the holder is in the hole-closing position.

15. In a musical instrument of the wood wind type, the combination of a body having lateral tone holes, a stopper mounted upon said body in position to open and close one of said holes, a positive operating member and a yielding operating member arranged to act simultaneously on said stopper to produce a predetermined movement thereof when said positive member is operated, a third operating member movable independently of the said positive operating member and means for transmitting force from said third operating member to the said piece located to apply such force in a direction opposed to that in which force is applied by said yielding means, but not in the same direction as that in which force is applied by said positive operating member.

16. In a musical instrument, a body having lateral tone-holes, a tone-hole stopper arranged to co-act with one of said holes, means consisting of a positive operating member and a yielding operating member carrying said stopper arranged to act in conjunction to give movement to said stopper, and a third operating member connected to give another movement to said stopper in opposition to the yielding operating member.

17. In a musical instrument, the combination of a body having lateral tone holes, a pivotally mounted holder, a stopper pivotally mounted on said holder, adapted to be moved with the holder toward and from one of said tone holes and also to be moved relatively thereto about its own axis, a manually operated member connected with said holder for moving the same, and a second manually operated member connected with said stopper for moving the stopper independently of the movement of the holder.

18. In a key mechanism the combination of a pivotally mounted holder, and a stopper pivotally mounted on said holder, adapted to be moved with the holder and also to be moved relatively thereto about its own axis, a finger-operated member connected for moving said holder, and another finger-operated member connected for moving said stopper relatively to the holder.

19. In a musical instrument, a body having tone holes, a finger-operated member pivotally mounted on the body of the instrument and adapted to be moved about its pivot toward and away from said body, and a stopper pivotally connected with and carried by said member over one of the tone holes, located in position to be closed upon such hole when said member is pressed upon.

20. A musical instrument comprising a body having tone holes, a pivotally mounted hole stopper arranged to stop one of such holes, two operating members, a motion-transmitting means between each of said operating members and said stopper, said means being effective when both operating members are simultaneously moved to give the full motion to the stopper, and each being effective when independently moved to give a part of such movement to the stopper.

21. A musical instrument of the wood wind type comprising a tubular body having lateral tone holes, a carrier pivotally mounted on said body, a hole stopper pivotally connected to said carrier in position over one of said holes to open and close the same, and on a different axis from that of the carrier, a finger piece connected with said carrier for moving the latter, and a second finger piece having such engagement with the stopper as to be capable of moving the latter relatively to said carrier when the carrier is in any of the positions which it is capable of occupying.

22. A musical instrument of the wood wind type comprising in combination, a body having lateral tone holes, a yoke pivotally mounted on said body, a floating piece pivotally mounted on said yoke on a different axis from that of the yoke and carrying a hole stopper, a manually operated arm pivotally mounted on a different axis from the floating piece and a link connecting said arm with said floating piece at a point eccentric to the axis of the latter, whereby to move the floating piece relatively to the yoke.

23. A musical instrument of the wood wind type comprising the combination of a body having lateral tone holes, a holder pivotally mounted on the body of the instrument, a finger-operated member for moving said holder about its pivot, a floating piece pivotally mounted on said holder on a different axis from that of the holder, and manually operated means connected with said floating piece eccentrically of the pivot thereof for moving the same relatively to the holder about its own axis.

24. A musical instrument of the wood wind type comprising the combination of a body having lateral tone holes, a hole stopper mounted on said body with provision for a plurality of movements relatively thereto, displaceable manually operated means for giving one of said movements to said stopper, and separate displaceable means for giving another of said movements to said stopper, each of said means being operable to move the stopper when the other means is displaced.

25. In a musical instrument of the character described, a body having tone holes, a hole stopper mounted on said body with provision for a compound movement, means for giving one of the components of such movement to said stopper, means yieldingly acting to give another of the components of such movement to said stopper, and positively acting means for overcoming and making nugatory the effect of said yieldingly acting means.

26. In a musical instrument of the character described, the combination of a body having tone holes, a carrier mounted movably on said body, a floating piece mounted pivotally upon said carrier and capable of motion relatively thereto, means for moving said carrier and therewith said floating piece, yielding means normally holding said floating piece in a determined position, manually operated means for overcoming said yielding means and moving said floating piece relatively to the holder, said manually operated means being of a yielding character, and positive manually operated means for overcoming and reversing the effect of that manually operated means which is of yielding character.

27. In a musical instrument of the character described, a body having tone holes, a yoke pivotally mounted on said body, a floating stopper lever carried by said yoke and pivoted thereto on a different axis from that of the yoke, means operated by a finger of the player for moving the yoke and floating lever together, an arm also manually operated, and a connection between said arm and the floating lever, said connection being eccentric to the axes of both the arm and lever, whereby movement of said arm is adapted to move the lever relatively to the yoke.

28. A key mechanism of the character described, comprising a carrier, a stopper lever pivoted to said carrier on a different axis from that of the carrier, means for moving the carrier and stopper lever together, a pivotally mounted arm connected with said stopper lever at a point eccentric to the pivot of the latter, and means for operating said arm whereby to move the stopper lever relatively to the carrier.

29. A key mechanism of the character described, comprising a carrier, a floating lever pivoted to said carrier on a different axis from that of the carrier, means for moving the carrier and floating lever together, a pivotally mounted arm connected with said floating lever at a point eccentric to the pivot of the latter, said means being manually operable and constructed to apply force yieldingly, and a further manually operated means arranged to oppose and overcome the force applied by said arm.

30. A key mechanism of the character described, comprising a carrier, a floating lever pivoted to said carrier on a different axis from that of the carrier, means for moving the carrier and floating lever together, a pivotally mounted arm connected with said floating lever at a point eccentric to the pivot of the latter, yielding means tending to hold the floating lever in a determined position, and arranged to be opposed and overcome by said arm, said arm being manually operated and being itself yielding, and positively acting manually operated means for opposing and overcoming the yielding force of said arm.

31. In a musical instrument of the woodwind type, the combination with a tubular body having lateral tone holes and a stopper located over one of said holes for opening and closing the same, of a finger piece mounted and connected to move said stopper in one direction, a second finger piece, and a spring in connection with said second finger piece operable thereby to apply force to the stopper for causing motion thereof in the direction opposite to that in which the stopper is moved by the first finger piece.

32. In a musical instrument of the woodwind type, the combination of a body having lateral tone holes and a key mechanism comprising a group of two hole-stoppers and three keys, said stoppers arranged to co-act with two of the holes of the instrument, and said keys being mounted for independent operation by the player's digits, connections through which depression of one of said keys moves said stoppers toward the instrument body, connections between one of said stoppers and a second key through which depression of the second key withdraws said stopper, and connections between the second stopper and the third key through which depression of said third key gives the second stopper a further movement in the direction given by depression of the first key.

33. In a musical instrument of the woodwind type, the combination with a body having a bore and lateral tone holes, of a key mechanism comprising a group of two stoppers arranged to cover respectively two of the tone holes, and three pivotally mounted finger keys, floating pieces carrying said stoppers, holding means for said floating pieces rigidly connected with one of said keys and movable oscillatively therewith, said floating pieces being pivoted to said holding means eccentrically of the pivot of the latter, means connecting one of said floating pieces with another of said keys at points eccentric to the pivots of the floating piece and of the last-named key respectively and on the same side of a plane passing through such pivots, whereby movement of both keys in approximately the same direction is compounded to move the stopper in one direction, and means connecting the second floating piece with the third key at points eccentric to their respective pivots and on relatively opposite sides of such plane, whereby the third key is enabled to move the second stopper in the opposite direction to that in which the first key moves the second stopper.

34. In a musical instrument of the woodwind type, the combination with a body having a bore and lateral tone holes, of a key mechanism comprising a pivotally mounted holder movable toward and from the instrument body, floating pieces to which said stoppers are respectively connected independently pivoted upon said holder and movable relatively thereto about an axis eccentric to that of the holder toward and from two of the tone holes of the instrument, respectively, a finger key connected to said holder and operable to move the same and therewith the stoppers toward the instrument, a second finger key connected with one of said floating pieces and operable while the first key is displaced to raise the corresponding stopper, and a third finger key connected with the other floating piece and operable independently of the other keys to depress the last named floating piece and the stopper connected therewith.

35. In a musical instrument of the woodwind type, the combination with a body having a bore and lateral tone holes, of a key mechanism comprising a stopper movable toward and away from the body to close and open one of said holes, two keys and intermediate connections between both keys and the stopper arranged for operation by movement of the two keys simultaneously to close the stopper, said connections holding the stopper open unless both keys are depressed.

36. In a musical instrument of the woodwind type, the combination with a body having a bore and lateral tone holes, of a key mechanism comprising a stopper arranged to cover one of such tone holes, two pivotally mounted finger keys, a floating piece carrying said stopper, means rigidly connected with one of said keys and movable oscillatively therewith for holding said floating piece, said floating piece being pivoted to said holding means eccentrically of the pivot thereof, and means connecting said floating piece with the other key at points eccentric to the pivots of the floating piece and of the last-named key, respectively, and on the same side of a plane passing through such pivots, whereby movement of both keys in approximately the same direction is compounded to move the stopper in one direction.

37. In a musical instrument of the woodwind type, the combination with a body having a bore and lateral tone holes, of a key mechanism comprising a stopper arranged to cover one of the tone holes, two pivotally mounted finger keys, a floating piece carrying said stopper, holding means for said floating piece rigidly connected with one of said keys and movable oscillatively therewith, said floating piece being pivoted to said holding means eccentrically of the pivot thereof, and means connecting the said floating piece with the other key at points eccentric to the respective pivots of the floating piece and second key and on opposite sides of a plane passing through such pivots, whereby the second key is enabled to move the stopper in the opposite direction to that in which it is moved by the first key.

38. In a musical instrument, the combination of a body having lateral holes, a stopper adapted to close one of said holes and a linkage for actuating said stopper comprising a floating member with which said stopper is connected, said floating member having a compound motion, a positive actuator for giving one of the component parts of such motion to said floating member, a yielding actuator for giving another of the components of such motion to said floating member, and a positive actuator for overcoming the effect of said yielding means and reversing the motion given to the floating member thereby.

39. In a musical instrument, the combination with a tubular body having lateral tone holes, of a key mechanism comprising two stoppers arranged in position to open and close two of said holes, and three keys, one of said keys being connected to both stoppers and movable to carry said stoppers toward their respective holes, another of the keys being connected with one of said stoppers to completely close the same upon its hole, and a yielding actuator connected with the other stopper and normally acting to press the latter toward its hole, the third key being mounted and connected to open the latter stopper against the force applied by said yielding actuator.

40. In a musical instrument, the combination with a tubular body having lateral tone holes, of a key mechanism comprising two stoppers arranged in position to open and close two of said holes, a yielding actuator and two keys, two of said keys being coupled with one of the stoppers for closing the latter upon its hole, and one of the keys and said yielding actuator being coupled with the other stopper for closing the same upon its hole.

41. In a musical instrument, the combination with a tubular body having lateral tone holes, of a key mechanism comprising two stoppers arranged in position to open and close two of said holes, three keys and a yielding actuator, two of said keys being coupled with one of the stoppers for joint action in closing the same upon its hole, one of the keys and said yielding actuator being coupled to the other stopper for closing the same upon its hole, and the third key being located to apply force to the last-named stopper in opposition to the yielding actuator to open said stopper while the key which is coupled thereto is in the stopper-closing position.

42. In a musical instrument, the combination with a tubular body having lateral tone holes, of a key mechanism comprising two stoppers arranged in position to open and close two of said holes, two keys coupled to one of said stoppers for closing the same upon its hole, each of said keys imparting a portion of the hole-closing movement to the stopper, a connection from one of said keys to the other stopper whereby the key is operative to move the stopper partly into hole-closing position, a yielding actuator connected to the latter stopper and normally acting to complete the hole-closing movement thereof, a third key, a spring connected to said key and positioned so as to apply force tending to open the last named stopper when the key is operated, said spring being more powerful than the said yielding actuator, and an arrester connected to the other of the two first-named keys positioned to obstruct said spring and make the same inoperative when the last-named key is operated.

43. In a musical instrument, the combination with a tubular body having lateral tone holes, of a key mechanism comprising two stoppers arranged in position to open and close two of said holes, a carrier pivoted to the body on which said stoppers are pivotally mounted on an axis at one side of the pivot of the carrier, a key connected to said carrier operable to move the same and the stoppers toward the holes with which they coact, a second key connected to one of said stoppers for completing the movement of the same toward its hole, a yielding actuator connected with the other stopper and normally caused to place the latter stopper in closed position when the first key is operated, a third key, a spring connected to said third key being more powerful than said yielding actuator and arranged to apply force to the second stopper tending to open the same when said third key is operated, and a positive abutment connected to the second named key in the path of said spring positioned to render said spring inoperative when said second key is operated.

44. A musical instrument comprising a tubular body with lateral holes, and a key mechanism applied to said instrument consisting of a stopper for one of said holes, and two finger-operated members associated with said stopper whereby to move the same when pressed upon, one of said members being movable with the effect of shifting the stopper from closed to open position during persistence of the pressure application on the other of said members.

45. A musical instrument of the wood-wind type having a tubular body provided with lateral holes, and including a key mechanism; said mechanism comprising a hole stopper and two finger pieces movable by pressure applied by the digits of the performer each actuating said stopper and one of them being effective to move the stopper while the other one is pressed upon.

46. A musical instrument of the wood-wind type having a tubular body provided with lateral holes, and including a key mechanism; said mechanism comprising a hole stopper and two finger pieces movable by pressure applied by the digits of the performer each actuating said stopper and one of them being effective to move the stopper while the other one is pressed upon and being arranged to apply further pressure to the last named piece when so moving the stopper.

47. A musical instrument of the wood-wind type having a tubular body provided with lateral holes, and including a key mechanism; said mechanism comprising a plurality of hole stoppers and a plurality of operating members, with engaging means between certain of said stoppers and certain of said members arranged to enable one operating member to control the action of two stoppers, and two operating members to control the action of one stopper.

48. A musical instrument of the wood-wind type having a tubular body provided with lateral tone holes, in combination with a key mechanism consisting of a stopper for one of the holes, a plurality of finger pieces both coacting with said stopper, and a spring also acting on said stopper, the coöperation of two of the three members constituted by the finger pieces and spring being effective to place the stopper in one of the two positions constituting the hole-closing or hole-opening condition, and the actuation of the other member serving to place the stopper in the other position.

In testimony whereof I have affixed my signature, in presence of two witnesses.

ALLEN LOOMIS.

Witnesses:
H. A. ATWATER,
GEORGE B. PERRY.